United States Patent
Baskaran et al.

(10) Patent No.: US 9,471,377 B2
(45) Date of Patent: Oct. 18, 2016

(54) SYSTEMS AND METHODS FOR PARALLELIZING AND OPTIMIZING SPARSE TENSOR COMPUTATIONS

(71) Applicant: Reservoir Labs, Inc., New York, NY (US)

(72) Inventors: Muthu M. Baskaran, Bayonne, NJ (US); Thomas Henretty, Brooklyn, NY (US); M. H. Langston, New Windsor, NY (US); Richard A. Lethin, New York, NY (US); Benoit J. Meister, New York, NY (US); Nicolas T. Vasilache, New York, NY (US)

(73) Assignee: Reservoir Labs, Inc., New York, NY (US)

( * ) Notice: Subject to any disclaimer, the term of this patent is extended or adjusted under 35 U.S.C. 154(b) by 0 days.

(21) Appl. No.: 14/540,427

(22) Filed: Nov. 13, 2014

(65) Prior Publication Data

US 2015/0169369 A1    Jun. 18, 2015

Related U.S. Application Data

(60) Provisional application No. 61/903,625, filed on Nov. 13, 2013.

(51) Int. Cl.
*G06F 9/46* (2006.01)
*G06F 9/48* (2006.01)

(52) U.S. Cl.
CPC ....... *G06F 9/4881* (2013.01); *G06F 2209/483* (2013.01)

(58) Field of Classification Search
CPC .................................................. G06F 9/4881
USPC ................................................. 718/101–108
See application file for complete search history.

(56) References Cited

U.S. PATENT DOCUMENTS

| | | | | |
|---|---|---|---|---|
| 7,693,847 B1 * | 4/2010 | Brown | ................... | G06F 9/5038 707/694 |
| 8,108,844 B2 * | 1/2012 | Crutchfield | ............. | G06F 8/443 717/136 |
| 2007/0294666 A1 * | 12/2007 | Papakipos | ................. | G06F 8/20 717/119 |
| 2007/0294696 A1 * | 12/2007 | Papakipos | ............. | G06F 9/5027 718/102 |
| 2008/0005547 A1 * | 1/2008 | Papakipos | ............. | G06F 9/5027 712/244 |

(Continued)

OTHER PUBLICATIONS

Numata, Kazumiti. "Property of the Optimum Relaxed Solution for Problem to Schedule Independent Tasks on Unrelated Processors." Journal of the Operations Research Society of Japan 32.2 (1989): pp. 233-259.*

(Continued)

*Primary Examiner* — Satish Rampuria
(74) *Attorney, Agent, or Firm* — Goodwin Procter LLP

(57) ABSTRACT

A scheduling system can schedule several operations for parallel execution on a number of work processors. At least one of the operations is not to be executed, and the determination of which operation or operations are not to be executed and which ones are to be executed can be made only at run time. The scheduling system partitions a subset operations that excludes the one or more operation that are not to be executed into several groups based on, at least in part, an irregularity of operations resulting from the one or more operation that are not to be executed. In addition, the partitioning is based on, at least in part, locality of data elements associated with the subset of operations to be executed or loading of the several work processors.

59 Claims, 12 Drawing Sheets

```
Algorithm 1 CP-ALS Algorithm
    repeat
        for n = 1...N do
            V = A^(1)T A^(1) * ... * A^(n-1)T A^(n-1) * A^(n+1)T A^(n+1) *
                ... * A^(N)T A^(N)
            U = X_(n) (A^(N) ⊙ ... ⊙ A^(n+1) ⊙ A^(n-1) ⊙ ... A^(1))
            A^(n) = UV†
        end for
    until convergence
```

(56) References Cited

U.S. PATENT DOCUMENTS

2009/0055829 A1* 2/2009 Gibson ............... G06F 9/4881 718/103
2014/0137104 A1* 5/2014 Nelson ............... G06F 9/45558 718/1

OTHER PUBLICATIONS

Tsuchiya, T., Osada, T., & Kikuno, T. (Dec. 1997). A new heuristic algorithm based on GAs for multiprocessor scheduling with task duplication. In Algorithms and Architectures for Parallel Processing, 1997. ICAPP 97., 1997 3rd International Conference on (pp. 295-308). IEEE.*

Isoya, Y., Nishi, T., & Inuiguchi, M. (Jul. 2010). A cut and column generation for flowshop scheduling problems to minimize the total weighted tardiness. In Industrial Informatics (INDIN), 2010 8th IEEE International Conference on (pp. 839-844). IEEE.*

Catalyurek, Umit, et al. (2011) "PaToH: Partitioning Tool for Hypergraphs" *Encyclopedia of Parallel Computing*, Springer US, (33 pages).

Chi, Eric C., et al. (Dec. 2012), "On Tensors, Sparsity, and Non-negative Factorizations," *SIAM Journal on Matrix Analysis and Applications*, 33(4), (28 pages).

Frasca, Michael, et al. (Nov. 10-16, 2012) "NUMA-Aware Graph Mining Techniques for Performance and Energy Efficiency," *High Performance Computing, Networking, Storage and Analysis (SC)*, IEEE, (11 pages).

Kolda, Tamara G., et al., (Aug. 5, 2009) "Tensor Decompositions and Applications," *SIAM Review*, vol. 51, No. 3, (pp. 455-500).

Lethin, Richard, et al., (Apr. 4, 2014) "Final Report on the R-Stream 3.0 Compiler," Reservoir Labs, Inc., Manual, (194 pages).

Leung, Allen, et al. (Mar. 14, 2010) "A Mapping Path for mulit-GPGPU Accelerated Computers from a Portable High Level Programming Abstraction," *Proceedings of the 3rd Workshop on General-Purpose Computation on Graphics Processing Units*, ACM, (11 pages).

McCormick, Patrick S., et al., (Sep. 13, 2011) "Empirical Memory-Access Cost Models in Multicore NUMA Architectures," *Virignia Tech Department of Computer Science*, (11 pages).

Meister, Benoit, et al. (Jun. 2009) "Productivity via Automatic Code Generation for PGAS Platforms with the R-Stream Compiler," *Workshop on Asynchrony in the PGAS Programming model*, (15 pages).

Pinar, Ali, et al., (Jan. 1999) "Improving Performance of Sparse Matrix-Vector Multiplication," *Proceedings of the 1999 ACM/IEEE Conference on Supercomputering*, ACM, (10 pages).

Shetty, Jitesh, et al., (Mar. 2004) "The Enron Email Dataset Database Schema and Brief Statistical Report," *Information Sciencfes Institute Technical Report, University of Southern California*, (7 pages).

Vasilache, Nicolas, et al., (Jan. 23, 2012) "Joint Scheduling and Layout Optimization to Enable Multi-Level Vectorization," *IMPACT*, Paris, France, (9 pages).

Vasilache, Nicolas, et al., (Jan. 23, 2012) "Trading Off Memory for Parallelism Quality," *International Workshop oon Polyhedral Compilation Techniques, Impact*, (9 pages).

Viswanath, Bimal, et al., (Aug. 17, 2009), "On the Evoluation of User Interaction in Facebook," *In Proceedings of the 2nd ACM workshop on Online Social Networks*, ACM, (6 pages).

* cited by examiner

Algorithm 1 CP-ALS Algorithm repeat
  for $n = 1 \ldots N$ do
    $V = A^{(1)T}A^{(1)} * \cdots * A^{(n-1)T}A^{(n-1)} * A^{(n+1)T}A^{(n+1)} *$
    $\cdots * A^{(N)T}A^{(N)}$
    $U = X_{(n)}(A^{(N)} \odot \cdots \odot A^{(n+1)} \odot A^{(n-1)} \odot \ldots A^{(1)})$
    $A^{(n)} = UV^\dagger$
  end for
until convergence

FIG. 1

Algorithm 2 CP-APR Algorithm repeat
  for $n = 1 \ldots N$ do
    $B = A^{(n)}\Lambda$
    $\Pi = (A^{(N)} \odot \cdots \odot A^{(n+1)} \odot A^{(n-1)} \odot \ldots A^{(1)})^T$
    repeat
      $\Phi = (X_{(n)} \oslash (B\Pi))\Pi^T$
      $B = B * \Phi$
    until convergence
    $\lambda = e^T B$
    $A^{(n)} = B\Lambda^{-1}$
  end for
until convergence

FIG. 2

```
for i = 1...nnz do
   for r = 1...R do
      Π(i,r) = ∏_{k=1, k≠n}^{N} A^{(k)}(IND(i,k),r)
   end for
end for
```

FIG. 3A

```
for i = 1...nnz do
   v = 0
   for r = 1...R do
      v+ = B(IND(i,n),r) * Π(i,r)
   end for
   v = VAL(i)/v
   for r = 1...R do
      Φ(IND(i,n),r)+ = v * Π(i,r)
   end for
end for
```

FIG. 3B

```
for i = 1...nnz do
   for r = 1...R do
      p = ∏_{k=1, k≠n}^{N} A^{(k)}(IND(i,k),r)
      Φ(IND(i,n),r)+ = VAL(i) * p
   end for
end for
```

FIG. 4

Algorithm 3 CP-ALS Algorithm indicating our modifications repeat
    for $n = 1 \ldots N$ do
        $V = A^{(1)T}A^{(1)} * \ldots * A^{(n-1)T}A^{(n-1)} * A^{(n+1)T}A^{(n+1)} * \ldots * A^{(N)T}A^{(N)}$
        if first iteration along mode n then
            *Locality-aware dynamically scheduled* mttkrp *computation:* $U = X_{(n)}(A^{(N)} \odot \cdots \odot A^{(n+1)} \odot A^{(n-1)} \odot \ldots A^{(1)})$
            *Log the work load distribution information*
        else
            *Statically scheduled (from the log)* mttkrp *computation:* $U = X_{(n)}(A^{(N)} \odot \cdots \odot A^{(n+1)} \odot A^{(n-1)} \odot \ldots A^{(1)})$ end if
        $A^{(n)} = UV^*$
    end for
until convergence

FIG. 6

```
Algorithm 4 CP-APR Algorithm indicating our modifications
  repeat
    for n = 1...N do
      B = A⁽ⁿ⁾Λ
      if first iteration along mode n then
        Locality-aware dynamically scheduled Π computa-
        tion: Π = (A⁽ᴺ⁾⊙···⊙A⁽ⁿ⁺¹⁾⊙A⁽ⁿ⁻¹⁾⊙...A⁽¹⁾)ᵀ
        Log the work load distribution information
      else
        Statically scheduled (from the log) Π computation:
        Π = (A⁽ᴺ⁾⊙···⊙A⁽ⁿ⁺¹⁾⊙A⁽ⁿ⁻¹⁾⊙...A⁽¹⁾)ᵀ
      end if
      repeat
        if first iteration along mode n then
          Locality-aware dynamically scheduled Φ compu-
          tation: Φ = (X₍ₙ₎ ⊘ (BΠ))Πᵀ
          Log the work load distribution information
        else
          Statically scheduled (from the log) Φ computation:
          Φ = (X₍ₙ₎ ⊘ (BΠ))Πᵀ
        end if
        B = B * Φ
      until convergence
      λ = eᵀB
      A⁽ⁿ⁾ = BΛ⁻¹
    end for
  until convergence
```

FIG. 7

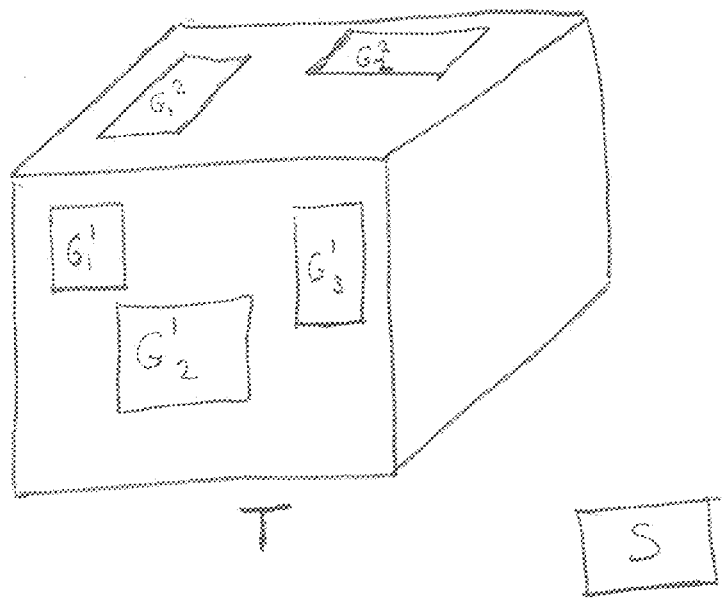
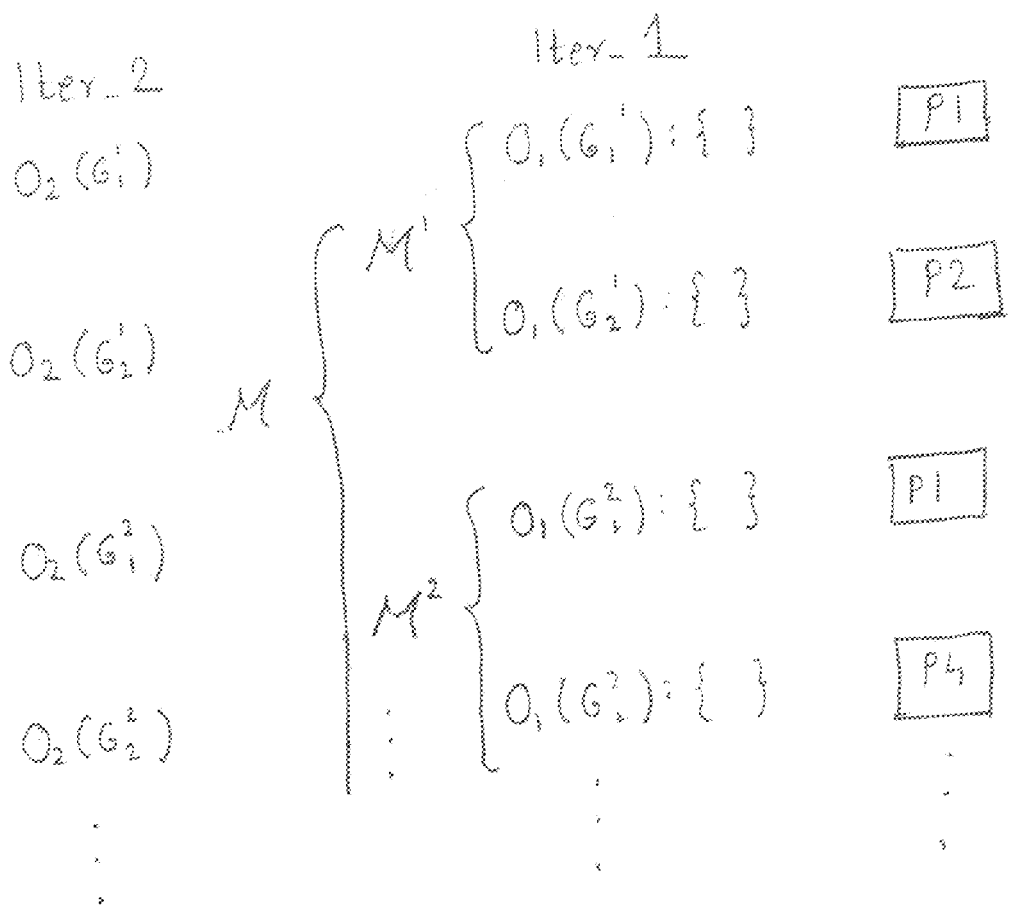
FIG 9

(a) Facebook Data    (b) Enron Data    (c) Cyber Data

SYSTEMS AND METHODS FOR PARALLELIZING AND OPTIMIZING SPARSE TENSOR COMPUTATIONS

CROSS REFERENCE TO RELATED APPLICATIONS

This application is related to and claims the benefit of priority to U.S. Provisional Patent Application Ser. No. 61/903,625 filed on Nov. 13, 2013, the entirety of which is incorporated herein by reference.

FIELD OF THE INVENTION

The present disclosure generally relates to computations using more than one processor. More particularly, the disclosure describes a system, methods, and apparatus for performing irregular operations using several processors.

BACKGROUND OF THE INVENTION

Many critical data applications include irregular computations, such as computations over sparse data or computations in which what particular operations are to be performed may be determined at run time, based on the values of one or more data elements. As an example, many real-world data analysis applications use multi-linear algebraic (or tensor) computations, such as tensor decompositions, for performing analysis of multi-dimensional real-world data. The multi-dimensional arrays representing real data are usually very large and can be sparse making the tensor computations performed over them irregular. These large, sparse multi-dimensional arrays (generally called sparse tensors) pose significant challenges to optimizing computations performed with them. The corresponding irregular sequence of operations (also called an irregular code) is, in general, harder to parallelize than a regular sequence of operations at least in part because the amount of parallelism may be dependent on the input data that can be known only at run time. Further, the irregular codes are usually memory-bound and the processor often spend substantial time in accessing the required memory locations. The fact that data locality optimizations may depend on the input data, which may become available only at run time, can further complicate the design of locality, parallelization, and/or other optimizations that may be used to improve the performance of irregular codes. Additionally, the volume of data processed in critical data applications are growing in size, adding to the complexity.

Multi-core architectures, which can include several cores within a single chip, and several cores across different chips in one or more packages, and multi-processor architectures are becoming increasingly popular. In this disclosure, multi-core systems generally include multi-processor systems. These system can facilitate parallel execution of computational tasks, and may direct current and future system designs. Optimizing irregular computations on modern multi-core systems is therefore an important problem to address. Memory issues may highly affect high-performance software design and these issues are usually complicated by the multi-core trend. For performance reasons, some modern multi-core systems have a complex hierarchy of memory units exhibiting a Non-Uniform Memory Access (NUMA) model in which there is a great diversity in latency across different memory units, which may include off-chip DRAM and several levels of on-chip and/or off-chip caches. Typically in a multi-core system, there are significant distances between cores and each core has one or more local caches that are closer to the core and have lower latency than the remote caches. Further, cores may be placed in distinct CPU sockets and that may introduce additional disparity in latency. These factors can affect the mapping of a software application to the available hardware system using several cores and having a hierarchical memory subsystem for maximizing the performance of the software system, e.g., maximizing the speed of execution, minimizing energy and/or power consumption, etc.

Various researchers have studied memory issues with NUMA. Also, there has been significant amount of work on optimizing sparse matrix computations—most of the optimizations target performance improvements at various memory levels in memory hierarchy including an optimized data structure for storing the sparse matrix, exploiting block structures in sparse matrix, and blocking for reuse at the level of cache, TLB, and registers. These efforts, however, do not address NUMA issues arising in sparse "multi-dimensional array" (e.g., having more than two dimensions) or sparse tensor computations wherein the challenges are significantly different from those arising from two-dimensional sparse matrix computations.

NUMA-aware graph mining techniques have been presented for graph problems such as Betweenness Centrality detection. Tensor computations may be considered to be "hypergraph" or "multi-link graph" computations, similar to graph computations, but the techniques applied for optimizing graph computations generally do not handle multiple access patterns arising from the same input data for different "mode" computations, which are commonly involved in Tensor computations. Some hypergraph partitioning techniques are well suited for partitioning sparse matrix computations. However, they would likely introduce costly overhead for sparse tensor computations. Another technique described in a co-pending application (U.S. patent application Ser. No. 13/898,159, entitled "Efficient and Scalable Computations with Sparse Tensors"), which is incorporated herein by reference in its entirety, describes new sparse tensor storage formats for improving the performance of sparse tensor computations, which may be complimentary to the embodiments described herein. Those systems and methods can improve single-node performance. Techniques to handle computations with very large sparse tensors on a distributed memory environment have also been presented, but these techniques do not take into account modern distributed memory clusters that include clusters of multi-core and/or multi-processor systems.

Irregular computations are often associated with sparse tensors. A tensor is a multi-dimensional array and the order of a tensor is the number of dimensions of the array, also called modes of the tensor. Two popular and prominent tensor decompositions are CANDECOMP/PARAFAC (CP) and Tucker decompositions. CP decomposition and two widely used algorithms to determine CP tensor decomposition are described below.

CP Decomposition: The CP tensor factorization decomposes a tensor into a sum of component rank-one tensors (A N-way e.g., N-mode tensor is called a rank-one tensor if it can be expressed as an outer product of N vectors). The CP decomposition that factorizes an input tensor $\chi$ of size $I_1 \times \ldots \times I_N$ into R components (with factor matrices $A^{(1)} \ldots A^{(N)}$ and weight vector $\lambda$) is of the form:

$$x = \sum_{r=1}^{R} \lambda_r a_r^{(1)} \circ \ldots \circ a_r^{(N)}$$

where $a_r^{(n)}$ represents the $r^{th}$ column of the factor matrix $A^{(n)}$ of size $I_n \times R$.

CP-ALS Algorithm: The widely used workhorse algorithm for CP decomposition is the alternating least squares (ALS) method. The CP-ALS algorithm is presented in Algorithm 1 depicted in FIG. 1.

CP-APR Algorithm: An Alternate Poisson Regression (APR) fitting algorithm for the non-negative CP tensor decomposition which is based on a majorization-minimization approach has also been developed. One embodiment of the CP-APR algorithm is presented in Algorithm 2, depicted in FIG. 2.

The main computations involved in the above algorithms include:

Tensor mode-n matricization or representing the N-dimensional tensor as a two dimensional matrix, $\chi \rightarrow X_{(n)}$ Matrix transpose Inverse of a diagonal matrix Pseudo-inverse of a matrix, $V^\dagger$ Matrix matrix multiplication, $C = A\ B$ Matrix Khatri-Rao product, $C = A \odot B$ Matrix element-wise division, $C = A \oslash B$ Matrix element-wise product (Hadamard product), $C = A * B$ When the input tensor is dense, the above-mentioned computations are all dense and regular. The R-Stream™ compiler has been well established as an effective source-to-source high level optimizing compiler to parallelize and optimize such dense regular computations. However when the input tensor is sparse, the computations involving (and affected by the) sparsity of the input tensor are also generally sparse and irregular. Examples of sparse computations include but are not limited to:

'Sparse' matricized tensor times Khatri-Rao product (mttkrp) computation in CP-ALS algorithm, represented as:

$$X_{(n)}(A^{(N)} \odot \ldots \odot A^{(n+1)} \odot A^{(n-1)} \odot \ldots A^{(1)})$$

$\Pi$ computation in CP-APR algorithm, represented as:

$$\Pi = (A^{(N)} \odot \ldots \odot A^{(n+1)} \odot A^{(n-1)} \odot \ldots A^{(1)})^T$$

$\Phi$ computation in CP-APR algorithm, represented as:

$$\Phi = (X_{(n)} \oslash (B\Pi))\Pi^T$$

In these computations, it can be assumed that the N-mode input tensor is stored in co-ordinate format, in which each non-zero element is represented by a vector of N indices and the non-zero value. A value is designated to be zero is the magnitude of the value is actually zero and/or if the magnitude of the value is less than a specified threshold. The threshold can be provided as a percentage of a maximum value. The values that are not designated as zero values are non-zero values. Let nnz be the number of non-zeroes in the input tensor. Let IND be a matrix of size nnz×N, representing the indices of all non-zero elements. Let VAL be a nnz×1 vector of non-zero values of the input tensor.

Computation of $\Pi$ in CP-APR: In the case of a dense input tensor, $\Pi$ would be a dense matrix of size $I_1 \ldots I_{n-1} I_{n+1} \ldots I_N \times R$. However, in the sparse tensor case, since only the elements that correspond to the non-zero indices of the input tensor are used further, the size of $\Pi$ needs to be at most nnz×R. The sparse computation of $\Pi$ for a mode n is depicted in FIG. 3A. It is important to note that the computation of $\Pi$ is generally different for each mode of the tensor. The computation may involve different arrays and/or different 'rows' of arrays depending on the non-zero indices of the sparse tensor.

Computation of $\Phi$ in CP-APR: The sparse computation of $\Phi$ for a mode n is depicted in FIG. 3B. Similar to the computation of $\Pi$, the computation of $\Phi$ can also be different for each mode of the tensor. This computation may involve different output arrays and/or a different pattern of accessing the non-zeroes of the input sparse tensor.

Computation of sparse mttkrp in CP-ALS}: The sparse computation of mttkrp for a mode n is depicted in FIG. 4. Like the previous computations, the computation of mttkrp can also be different for each mode of the tensor and may involve different output arrays, different input arrays, and/or a different pattern of accessing the non-zeroes of the input sparse tensor.

Improving the parallel performance of sparse tensor computations often encounters the following challenges. First, the amount of parallelism is usually dependent on the non-zero pattern of the input sparse tensor data that may become known only at run time. Second, tensor computations generally have "mode-specific operations," i.e., operations that access data with respect to the orientation of a mode or dimension of the multi-dimensional data. The presence of mode-specific operations can make optimizations harder as the parallelism and data locality characteristics for computations along one mode may differ from those of another mode for the same input data. Third, iterative repetition of mode-specific operations in sparse tensor codes can make the process of applying optimizations specific to a particular mode ineffective, because the liveness of the optimizations tends to become limited.

Some known techniques for sparse computations are often not effective and are not directly applicable for sparse tensor computations. For example, data reordering is a known technique for improving cache locality in irregular codes with sparse computations. While this technique is still useful for sparse tensor computations, reordering the input data once is not sufficient as computations along each mode require a different effective reordering and the reordering is complicated by the fact, as mentioned above, that there is usually an iterative repetition of mode-specific operations.

SUMMARY OF THE INVENTION

In various embodiments, irregular operations, such as those described above, can be executed efficiently using several processors by taking advantage of a relationship between different iterations of various groups of operations of the overall computation process. In particular, it can be determined how the operations associated with a single iteration of an overall computational process may be partitioned into different groups and executed efficiently by a number of processors. To this end, any of the dynamic scheduling techniques described above may be used. A mapping of the different groups of operations of the first iteration to the several processors is then obtained. Different mode-specific mappings may be obtained for different modes of computations. Thereafter, during a subsequent iteration, the operations of that later iteration that correspond to a particular group of operations of the prior iteration are identified and the aforementioned mapping is used to distribute the operations of the later iteration to the processor that was designated to execute the operations of the particular group during the prior iteration, without having to re-perform dynamic scheduling. This can decrease the overhead of scheduling operations on several processors, while facilitating parallel execution of the operations. Prior to distribution of the later-iteration operations, the mapping may be modified to balance the respective loads of different processors and/or to optimize locality of the operations.

Various embodiments described herein facilitate optimization of multi-dimensional sparse tensor computations on modern multi-core/multi-processor systems. These embodiments were evaluated using two popular sparse tensor decomposition methods that have wide applications in data mining, graph analysis, signal processing, and elsewhere. These methods are widely used in various real-world data analysis applications such as cybersecurity, environmental sensor analysis, and the like. Therefore, as described below, real-world sparse data sets were applied as input to during evaluation of various embodiments that schedule sparse tensor computations, to demonstrate the improvements achieved by different embodiments.

These embodiments feature one or more of: (i) a static-plus-dynamic task scheduling scheme with low overhead for effective parallelization of sparse computations; and (ii) a locality-aware factor in the task scheduling decision mechanism to improve data locality that is driven by the sparse data pattern of the input tensor. Additional features, such as load balancing, are also included in various embodiments.

Accordingly, in one aspect, various embodiments feature methods of scheduling operations on a number of work processors. The method includes using by a scheduler a mapping between a first set of operations and the work processors, where the mapping represents one or more of: (i) parallelization of the first set of operations, (ii) locality of data elements associated with the first set of operations, and (iii) workload of the work processors. The first set of operations generally correspond to a first iteration of a computation involving several iteration steps. The method also includes identifying by the scheduler, from a second set of operations, a subset of operations to be executed. The second set of operations generally correspond to a subsequent or later iteration of the computation and include at least one operation that is not to be executed. The method further includes designating by the scheduler the subset of operations to be executed to the work processors according to the mapping.

In some embodiments, the mapping includes: (i) a first mapping corresponding to a first mode associated with a data structure that includes a number of data elements, at least one of which is zero, and (ii) a second mapping also corresponding to the first mode. The data structure may include a tensor having at least three dimensions and, typically, several data elements may be zero. For the first mode, the mapping may include more than two mappings corresponding to different groups, as described below. The data elements may be partitioned, based on, at least in part, which data elements of the data structure are non-zero, into several groups that include a first group associated with the first mode and a second group also associated with the first mode. According to the grouping, first-iteration operations corresponding to the first and second groups associated with the first mode are executable in parallel, respectively, by a first work processor and a second work processor from the several work processors. The first set of operations includes the first-iteration operations corresponding to the first and second groups associated with the first mode. The first mapping corresponding to the first mode may include a designation of the first-iteration operations corresponding to the first group associated with the first mode to the first work processor. The second mapping corresponding to the first mode may include a designation of the first-iteration operations corresponding to the second group associated with the first mode to the second work processor.

The subset of operations to be executed may include: (i) second-iteration operations corresponding to the first group associated with the first mode, and (ii) second-iteration operations corresponding to the second group associated with the first mode. Designating by the scheduler the subset of operations to be executed to the work processors according to the mapping may include designating by the scheduler: (i) using the first mapping corresponding to the first mode, second-iteration operations corresponding to the first group associated with the first mode to the first work processor, and (ii) using the second mapping corresponding to the first mode, second-iteration operations corresponding to the second group associated with the first mode to the second work processor.

In some embodiments, a number of the first-iteration operations corresponding to the first group associated with the first mode is substantially equal to a number of the first-iteration operations corresponding to the second group associated with the first mode. As such, load balancing in these embodiments is based mainly on the number of operations and is not explicitly based on memory locality.

In some embodiments, the several work processors are in electrical communication with a work memory, and the work memory includes a number of work memory modules. Each work memory module may store and provide access to a different section of the data elements of the data structure. Each of the several work processors may be coupled to at least one different work memory module, such that the system of work processors as a NUMA architecture. Typically, all work processors may access data from any work memory module. "Coupled to" generally implies that the coupled work memory module is local to a particular work processor and other work memory modules, while accessible may be remote to that particular work processor.

In some embodiments the method includes, prior to designating the subset of operations to be executed to the work processors, modifying the mapping according to a workload of one or more work processors. To this end, the method may include monitoring for one or more of the work processors, a workload that may include a computation load corresponding to computation of operations designated to the respective work processors, and/or a memory access load of the respective work processors. The method may also include determining if one or more of the work processors are underloaded based on, at least in part, the respective computation loads, or the respective memory access loads, or combinations thereof. The method may also include modifying the mapping being based on, at least in part, the respective workloads one or more work processors that are determined to be underloaded.

In some embodiments, the first work processor is determined to be underloaded. Modifying the mapping may include identifying a first neighbor work processor that is closest to the first work processor among the several work processors, and where first-iteration operations corresponding to a first neighbor group of data elements associated with the first mode were designated to the first neighbor work processor. Closeness can be determined according to the memory architecture of the system that includes the work processors and the associated work memory modules. The method may also include migrating by the scheduler at least one second-iteration operation corresponding to the first neighbor group associated with the first mode, to the first mapping corresponding to a first mode, for execution by the first work processor. A data element(s) associated with the one or more second-iteration operations may be local to the first neighbor work processor and, as such, the migration may simultaneously optimize loading of the first and first neighbor work processors and locality of the data elements.

In some embodiments, identifying the first neighbor work processor includes selecting a work processor that would have a workload at least up to a specified threshold after migrating one or more operations that were previously designated to that work processor to the first mapping corresponding to a first mode, for execution by the first work processor. Thus, the selected neighbor from which operations are migrated to the first work processor does not become underloaded after the migration. Identifying the first neighbor work processor may include additionally, or in the alternative, selecting a work processor determined to be overloaded. The closest work processor may be selected from a subset of work processors that are determined to be overloaded. In some embodiments, the method includes identifying a second neighbor work processor that is closest to the first work processor among the several work processors except for the first neighbor work processor, where second-iteration operations corresponding to a second neighbor group of data elements associated with the first mode were designated to the second neighbor work processor. The method may include migrating by the scheduler at least one second-iteration operation corresponding to the second neighbor group associated with the first mode, to the first mapping corresponding to a first mode, for execution by the first work processor. As such, migration of operations from more than one work processors to a particular work processor is facilitated.

In some embodiments, the first work processor is determined to be underloaded. A work processor from the several work processors that is different from the first work processor may be designated as a lender work processor. First-iteration operations corresponding to a lender group of data elements associated with the first mode may have been designated to the lender work processor. Modifying the mapping in these embodiments includes migrating by the scheduler at least one second-iteration operation corresponding to the lender group associated with the first mode, to the first mapping corresponding to a first mode, for execution by the first work processor. Thus, operations/tasks may be migrated to the first work processor from any other work processor designated as the lender processor. In some embodiments, the lender work processor is determined to be overloaded. Thus, in some embodiments, the migration can balance the load without explicitly accounting for locality.

In some embodiments, the method includes, prior to designating the subset of operations to be executed to the work processors, modifying the mapping according to locality of data elements. Modifying the mapping may include identifying a lender work processor, where a first-iteration operation corresponding to a lender data element was designated to the lender work processor, and where the lender data element is local to the first work processor. The method may also include migrating by the scheduler a second-iteration operation corresponding to the lender data element to the first mapping corresponding to a first mode, for execution by the first work processor. The migration can thus cause an increase in the locality of data elements. In some embodiments, locality can be improved without specific regard to the loading of the work processors. The first work processor may be underloaded, and/or the lender work processor may be overloaded. The migration may thus improve locality and may balance the load of the work processors as well.

In some embodiments, the mapping includes a first mapping corresponding to a second mode associated with the data structure, and a second mapping corresponding to the second mode. The data elements may be partitioned, based on, at least in part, which data elements of the data structure are non-zero, into several groups that include a first group associated with the second mode and a second group also associated with the second mode. First-iteration operations corresponding to the first and second groups associated with the second mode can be executed in parallel, respectively, by a third work processor and a fourth work processor selected from the several work processors. The third work processor may be the same as the first or second work processors, or may be a different work processor. Similarly, the fourth work processor can be the first or second work processor, or a different work processor. The first set of operations include the first-iteration operations corresponding to the first and second groups associated with the second mode. The first mapping corresponding to the second mode includes a designation of the first-iteration operations corresponding to the first group associated with the second mode to the third work processor, and the second mapping corresponding to the second mode includes a designation of the first-iteration operations corresponding to the second group associated with the second mode to the fourth work processor.

In some embodiments, the subset of operations to be executed includes second-iteration operations corresponding to the first group associated with the second mode, and second-iteration operations corresponding to the second group associated with the second mode. Designating by the scheduler the subset of operations to be executed to the work processors according to the mapping may include designating by the scheduler, using the first mapping corresponding to second mode, second-iteration operations corresponding to the first group associated with the second mode to the third work processor. The method may also include using the second mapping corresponding to the second mode, designating by the scheduler second-iteration operations corresponding to the second group associated with the second mode to the fourth work processor. The method may include determining and storing the mapping by the scheduler.

In some embodiments, an iterative program specifies the operations that include the first set of operations, which generally correspond to a first iteration of the overall computation, and the second set of operations, which generally correspond to a second iteration of the overall computation. The first set of operations may include at least one operation that is executable only if a data-dependent condition is TRUE. That condition, however, may be determined to be FALSE at run time. The second set of operations may include at least one operation that is also executable only if the condition is TRUE. The method may include excluding from the subset of operations to be executed the one or more operation from the second set of operations, that are executable only if the condition is TRUE. A subset need not be generated first so that the operation(s) based on the FALSE condition are excluded from the subset at a later time. The subset can be constructed such that the operation(s) that are not to be executed are not included in the subset.

The mapping may include a first mapping associated with the program, and a second mapping also associated with the program. The operations may be partitioned, based on, at least in part, which operations are determined to be executed, into several groups that include a first group and a second group. The partitioning can group the operations into more than two groups. First-iteration operations of the first and second groups, respectively, are executable in parallel by a first work processor and a second work processor selected from the several work processors. The first set of operations includes the first-iteration operations of the first and second groups. The first mapping includes a designation of the first-iteration operations of the first group to the first work processor. Similarly, the second mapping includes a designation of the first-iteration operations of the second group to the second work processor.

In some embodiments, the subset of operations to be executed includes second-iteration operations corresponding to the first group, and second-iteration operations corresponding to the second group. Designating by the scheduler the subset of operations to be executed to the work processors according to the mapping may include designating by the scheduler, using the first mapping, second-iteration operations corresponding to the first group to the first work processor and, using the second mapping, second-iteration operations corresponding to the second group to the second work processor.

In some embodiments, the operations are associated with a number of data elements. The various work processors are in electrical communication with a work memory, and the work memory includes several work memory modules, each work memory module including (e.g., storing, accessing, etc.) a different section of the various data elements. Each work processor of the several work processors may be coupled to at least one different work memory module.

In some embodiments, the method includes, prior to designating the subset of operations to be executed to the work processors, modifying the mapping according to a workload of at least one work processor. To this end, the method may include monitoring for one or more of the work processors, a respective workload that includes a computation load corresponding to computation of operations designated to the respective work processor and a respective memory access load. The method may also include determining if the one or more work processors are underloaded based on, at least in part, the respective computation loads, the respective memory access loads, or combinations thereof. In these embodiments, the method also includes modifying the mapping being based on, at least in part, respective workloads of one or more work processor that are determined to be underloaded.

In some embodiments, the first work processor is determined to be underloaded. Modifying the mapping may include identifying a first neighbor work processor that is closest to the first work processor among the several work processors, where first-iteration operations corresponding to a first neighbor group of data elements were designated to the first neighbor work processor. Modifying the mapping may also include migrating by the scheduler one or more second-iteration operations corresponding to the first neighbor group, to the first mapping, for execution by the first work processor. Migration of operations from the closest neighbor to the first work processor may be performed before execution of the second-iteration operations, based on, at least in part, workload(s) observed during the first iteration.

In some embodiments, the first work processor is determined to be underloaded. A work processor selected from the several work processors that is different from the first work processor is designated as a lender work processor, where first-iteration operations corresponding to a lender group of data elements were designated to the lender work processor. Modifying the mapping may include migrating by the scheduler one or more second-iteration operations corresponding to the lender group to the first mapping, for execution by the first work processor. The lender work processor may have been determined to be overloaded.

In another aspect, a method of scheduling operations on several work processors includes receiving in memory a set of operations, at least one of which is not to be executed. The method also includes orchestrating by a scheduler a partitioning of a subset operations, that excludes the one or more operations that are not to be executed, into a number of groups, for parallel execution on the several work processors. The partitioning is based on, at least in part, an irregularity of operations resulting from the one or more operation not to be executed. The partitioning is also based on, at least in part, locality of data elements associated with the subset of operations, and/or loading of one or more of the several work processors.

In some embodiments, an initial map, that corresponds to an initial partitioning of the subset of operations into several groups, represents a mapping between the groups and the work processors. Orchestrating may include selecting by the scheduler a borrower work processor and a lender work processor. In addition, orchestrating may include modifying by the scheduler the initial map by migrating an operation from a group mapped to the lender work processor to a group mapped to the borrower work processor, for execution thereby. A data element associated with the operation may be local to the borrower work processor and may be remote to the lender work processor, such that locality of the data elements is increased. Locality may thus be improved without explicitly accounting for loading of the work processors.

In some embodiments, orchestrating includes balancing loading of the several work processors by the scheduler. The balancing may include selecting an underloaded work processor and an overloaded work processor, and modifying the initial map by migrating an operation from a group mapped to the overloaded work processor to a group mapped to the underloaded work processor, for execution thereby. Loading may thus be balanced without explicitly accounting for locality.

In some embodiments, selecting the overloaded work processor includes selecting a work processor that is closest in a memory hierarchy to the underloaded work processor and that has a work load at least equal to a specified threshold. Migrating the operation may include selecting an operation for which a data element associated with the operation is local to the overloaded work processor and remote to the underloaded work processor. As such, the migration may cause a simultaneous optimization of: (a) the locality of data elements associated with the subset of operations, and (b) loading of the plurality of work processors. Specifically, load of the work processors may become more balanced and any reduction in the locality is minimized.

The method may include generating by the scheduler the initial map using dynamic scheduling, that includes run-time identification of the one or more operations that are not to be executed. At least one operation that is not be executed may be associated with a data element that is zero, and/or a data-dependent condition.

In another aspect, a computer system includes a first processor and a first memory coupled to the first processor. The first memory includes instructions which, when executed by a processing unit that includes the first processor and/or a second processor, program the processing unit for scheduling operations on a number of work processors. To this end, the instructions program the processing unit to identify, using a mapping between a first set of operations and the work processors, from a second set of operations, a subset of operations to be executed. The mapping represents one or more of: (i) parallelization of the first set of operations, (ii) locality of data elements associated with the first set of operations, and (iii) workload of the work processors. The first set of operations generally correspond to a first iteration of a computation involving several iteration steps. The second set of operations generally correspond to a subsequent or later iteration of the computation and include at least one operation that is not to be executed. The instructions also program the processing unit to designate the subset of operations to be executed to the work processors according to the mapping.

In some embodiments, a second memory is coupled to the second processor, and can receive through a network the instruction stored in the first memory. In various embodiments, the instructions can program the processing unit to perform one or more of the method steps described above.

In another aspect, an article of manufacture that includes a non-transitory storage medium has stored therein instructions which, when executed by a processing unit program the processing unit to schedule operations on a number of work processors. To this end, the instructions program the processing unit to identify, using a mapping between a first set of operations and the work processors, from a second set of operations, a subset of operations to be executed. The mapping represents one or more of: (i) parallelization of the first set of operations, (ii) locality of data elements associated with the first set of operations, and (iii) workload of the work processors. The first set of operations generally correspond to a first iteration of a computation involving several iteration steps. The second set of operations generally correspond to a subsequent or later iteration of the computation and include at least one operation that is not to be executed. The instructions also program the processing unit to designate the subset of operations to be executed to the work processors according to the mapping. In various embodiments, the instructions stored in the article of manufacture can program the processing unit to perform one or more of the method steps described above.

BRIEF DESCRIPTION OF THE DRAWINGS

Various embodiments of the present invention taught herein are illustrated by way of example, and not by way of limitation, in the figures of the accompanying drawings, in which:

FIG. 1 shows one implementation of the CP-ALS algorithm;

FIG. 2 shows one implementation of the CP-APR algorithm;

FIGS. 3A and 3B depict exemplary computations of Π and Φ in CP-APR, respectively;

FIG. 4 depicts an exemplary computation of mttkrp in CP-ALS;

FIG. 6 depicts an implementation of the CP-ALS computations that are modified according to one embodiment;

FIG. 7 depicts an implementation of the CP-APR computations that are modified according to one embodiment;

FIG. 9 schematically depicts a mapping used in scheduling operations, according to one embodiment;

DETAILED DESCRIPTION OF THE INVENTION

The following techniques can address various challenges in optimizing sparse tensor computation. These techniques include one or more of: (i) identifying and extracting more concurrency; (ii) reducing barrier synchronizations or thread waits; (iii) improving data locality; (iv) improving load balance among processors; and (v) reducing parallelization overheads such as the task scheduling overhead.

Identifying and Extracting Parallelism: Tensor computations such as the tensor decomposition methods may involve complex data dependencies within the algorithm that make the task of exploiting concurrency a challenging one. Among the various possible concurrency or parallelism patterns, some of the most prevalent ones in sparse tensor computations include: 1) presence of parallelism to compute independent partial results from non-zeroes of input data and a reduction of the partial results after an all-to-all barrier synchronization among all processors, 2) presence of parallelism to compute independent partial results and using a critical section or lock mechanism to commit partial results to the final output data structure, and 3) presence of synchronization-free parallelism with an overlapping or non-overlapping partition of non-zeroes of input data. The first two patterns mentioned above are generally simpler than the third pattern, but may be less effective. The relative simplicity in the first two cases can result from the fact there is no need for partitioning the input non-zeroes based on their indices; a straightforward load-balanced partition may be sufficient, and each processor can independently process a partition and produce independent results on local variables, to be merged in the reduction phase, or produce independent results that are committed using a critical section or lock. In the third case, there is a need for partitioning the input data that depends on the sparse data indices, which are known only at run time. Hence there is a need for a run-time partitioning to realize such a parallelism pattern. This need arises, for example, in the sparse CP decomposition methods.

Figure 5A:
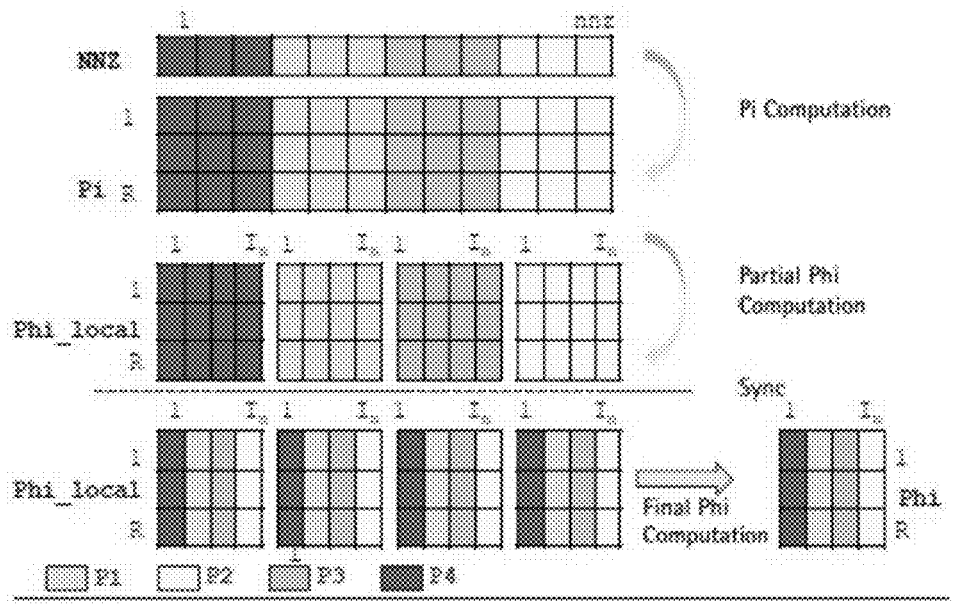
FIGS. 5A and 5B schematically illustrate "reduction_parallel" and "sync_free_parallel" patterns, respectively, according to one embodiment.
Figure 5B:
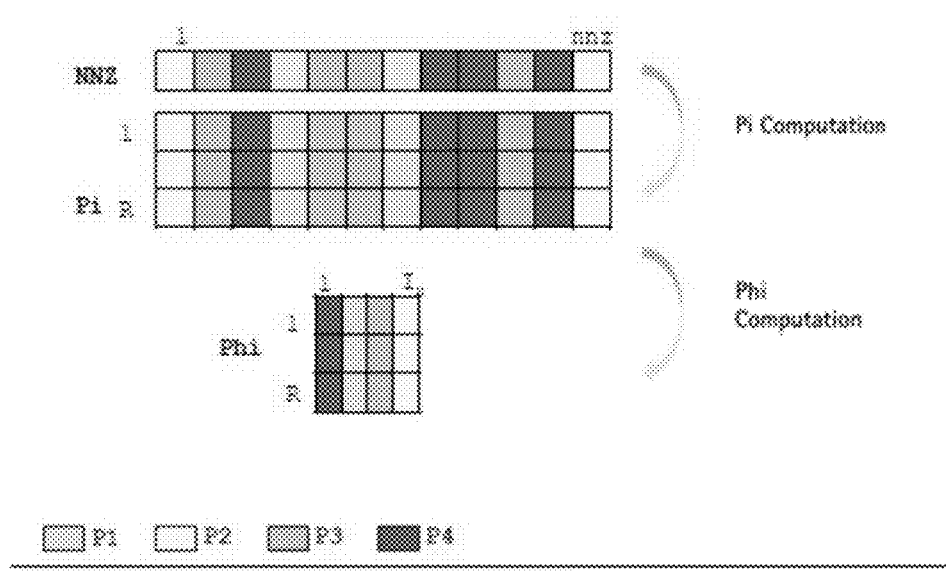

In the discussion herein, the two relatively simpler parallelization patterns are called reduction_parallel. FIGS. 5A and 5B illustrate these two parallelization patterns applied over the CP-APR decomposition method. The pattern with no barrier synchronization or thread wait is called sync_free_parallel. A technique that identifies good partitioning of the non-zeroes of input sparse data based on their indices and that enables more parallelism than conventional techniques (e.g., reordering), and/or can reduce barrier synchronizations or thread waits whenever possible, is described. One feature of the technique described herein is that the input tensor non-zeroes are partitioned potentially differently for each mode-specific computation into groups based on the index of the mode along which computations are performed, i.e., candidate mode, such that any two non-zeroes with the same index along a particular candidate mode fall within the same partition group. The number of partition groups generally depend on the number of processors. In some embodiments, each processor is assigned a different partition group.

First, any possibility of synchronization-free parallelism in the code is identified. For example, the parallelism detection phase of the R-Stream™ compiler may be used. Then, for each mode, the computations are performed in a fine-grained parallel manner and are dynamically assigned to processors such that the non-zeroes are distributed to non-overlapping partitions. If synchronization-free parallelism is not possible, reduction_parallel patterns are employed and, using a similar approach, the non-zeroes are partitioned dynamically while performing a fine-grained parallel execution of the original computations. Such partitioning may be performed for each mode. A light-weight run-time layer is implemented to perform this function of dynamically scheduling blocks of computations to processors and partitioning the workload. Non-Uniform Memory Access (NUMA) locality-aware factors may be considered while partitioning the workload, to improve data locality, as discussed below.

Relative to using the reduction_parallel patterns, it is more complex to achieve balanced load across the processors while exploiting sync_free_parallel patterns, and the load imbalance can lead to performance degradation. Load imbalance can arise while trying to exploit synchronization-free parallelism if the work load is divided based on the number of output elements rather than on the non-zeroes corresponding to each output element. The number of output elements may be statically known but the number of non-zeroes corresponding to each output element is dependent on the pattern of the non-zeroes of the input data and, hence, can be known only at run time. Therefore, one of the main challenges in this approach is to make all the partition groups equally balanced as much as possible as it may directly translate into processor load. Performing the partitioning along with the fine-grained parallel execution of the original computations can help in achieving a good balanced load distribution as described below.

Improving Load Balancing with Reduced Overhead: While proper scheduling is needed to schedule the computations across the processors in a balanced manner, it is often also equally important to have a low overhead scheduling so that the benefits of load balancing are not offset by the scheduling overhead. A parallelizing scheduler with a static task scheduling scheme generally has less scheduling overhead, but may not balance the load properly if the load balancing depends on dynamic run-time information, such as sparse input data (and their indices) that are known only at run time, in the case of sparse computations. On the other hand, a parallelizing scheduler with a dynamic task scheduling scheme generally has more scheduling overhead than the static scheme but can achieve relatively improved load balancing based on run-time information.

In various embodiments, when there are multiple iterations of a computation block, if the computation block is to be distributed across processors, and if the non-zero structure or access pattern does not significantly change within the block, the first iteration of the block is executed with a dynamic task scheduling scheme. The "state" information about the processor workload (such as which portions of the computation block (or equivalently tasks) get executed on which processor), is logged or stored. In the subsequent iterations, the logged/stored information about the processor workload is used to schedule statically various tasks across processors, thereby achieving the benefit of load balanced execution without incurring significant scheduling overhead. This static-plus-dynamic (or hybrid) task scheduling approach can greatly reduce the task scheduling overhead and also facilitate an improved load balance across processors. As described below, the load balance can be improved further via task/operation migration prior to the subsequent iterations.

In the case of sparse tensor computations, as mentioned earlier, there is usually a repetition of mode-specific operations and the iteration with dynamic scheduling is carefully chosen before the start of a computation block where the logged information obtained during the dynamic scheduling can be reused. The logged information may be stored for one or more modes, and sometimes for all modes, if the storage requirement does not exceed memory capacity, depending on the number of tasks/operations and the number of modes in the tensor.

Improving Performance through Better Data Locality: In some embodiments, data locality at each processor can be improved so as to facilitate scalable parallel performance using a large number of processors, e.g., 500 or even more cores/processors. Some of the advantages of these and previously described embodiments include: (i) improved load balance among processors with a reduced load balancing overhead at least compared to dynamically scheduling each and every operation; (ii) avoidance of unnecessary barrier synchronizations or waits; and (iii) avoidance of unnecessary "reduction" of partial results—thereby reducing synchronization and reducing memory storage for local variables. The following data locality optimizations may be achieved directly by exploiting the synchronization-free parallelization pattern. First, the production and consumption of data values can be brought closer and/or local to a processor, e.g., within the computation region that lies in between processor synchronizations. Second, data values can be stored locally to a processor.

In addition to the above-described optimizations that may be obtained via low-overhead parallelization, in some embodiments data locality in modern multi-core systems with NUMA behavior can be improved. To this end, locality-aware decisions are made while scheduling tasks to processors. Whether or not synchronization-free parallelism is employed, priority is given to schedule tasks that share data to processors that are closer in the NUMA topology. The information of what data is shared is also mostly known, however, only at run time. In particular, the shareability typically depends on the pattern of the non-zeroes of the input data that can also generally be determined only at run time.

In various embodiments, processors dynamically acquire workload through the light-weight run-time layer, while doing the actual computations simultaneously. Depending on the location of the data needed for the computations, each processor may spend different duration of time in waiting to load/store data (e.g., due to cache misses and/or other NUMA effects). This may lead to an imbalance in the workload acquired by each processor. The run-time layer can migrate workload (or equivalently tasks) from one processor to another so as to balance the load. The migration may be governed by the NUMA topology. In some embodiments, the processors are arranged in a binary tree-like NUMA topology. Therefore a processor is close to one processor at the innermost level of the tree, to three processors at the next level of the tree, and so on. From the binary representation of a processor identifier (ID) (e.g., an integer between 0 and p−1, where p is the number of processors), the NUMA neighbors of a particular processor can be identified at each level. Task migration using the neighborhood information may then be performed.

Specifically, in some embodiments, each work processor has a local work queue and the work processor may dynamically acquire the workload thereof, through the run-time layer and from a work pool of tasks. Using the acquired workload, the work processor can fill a local work queue thereof. The light-weight run-time layer may then access each processor's workload and may characterize each processor as "overloaded" or "underloaded" with respect to one or more specified thresholds such as the average workload. The average workload can be the total amount of computations needed by the problem divided by the number of available processors.

In some embodiments, for each underloaded processor, the run-time layer exclusively selects a topologically closer overloaded processor to borrow workload from. The migration may be done such that neither the "borrower" processor becomes overloaded nor the "lender" processor becomes underloaded as a result of migration. If load imbalance still exists, the runtime layer may select the next topologically closer overloaded processor for the underloaded processor, and may repeat the migration attempt going along the topology till specified balance criteria are met. Because the workload or tasks are migrated between processors based on their NUMA topology, data sharing is facilitated between NUMA neighbors. This optimization is useful in both performance improvement and performance scaling.

In a hybrid static-plus-dynamic task scheduling process described above, the NUMA-aware task migration is typically performed during the dynamic phase of task scheduling. A load balanced schedule, resulting after task migration, may be logged and used for statically scheduling the subsequent iterations. After applying all of the aforementioned scheduling techniques, the altered structure of CP-ALS and CP-APR algorithms obtained using one embodiment are presented in Algorithm 3 depicted in FIG. 6 and in Algorithm4, depicted in FIG. 7, respectively. It should be understood, that the CP-ALS and CP-APR algorithms are used for demonstration only and that various embodiments described herein can parallelize with low overhead and optionally optimize load balance and/or locality of various other iterative algorithms, some of which may involve sparse tensor computations while some may not.

Figure 8:
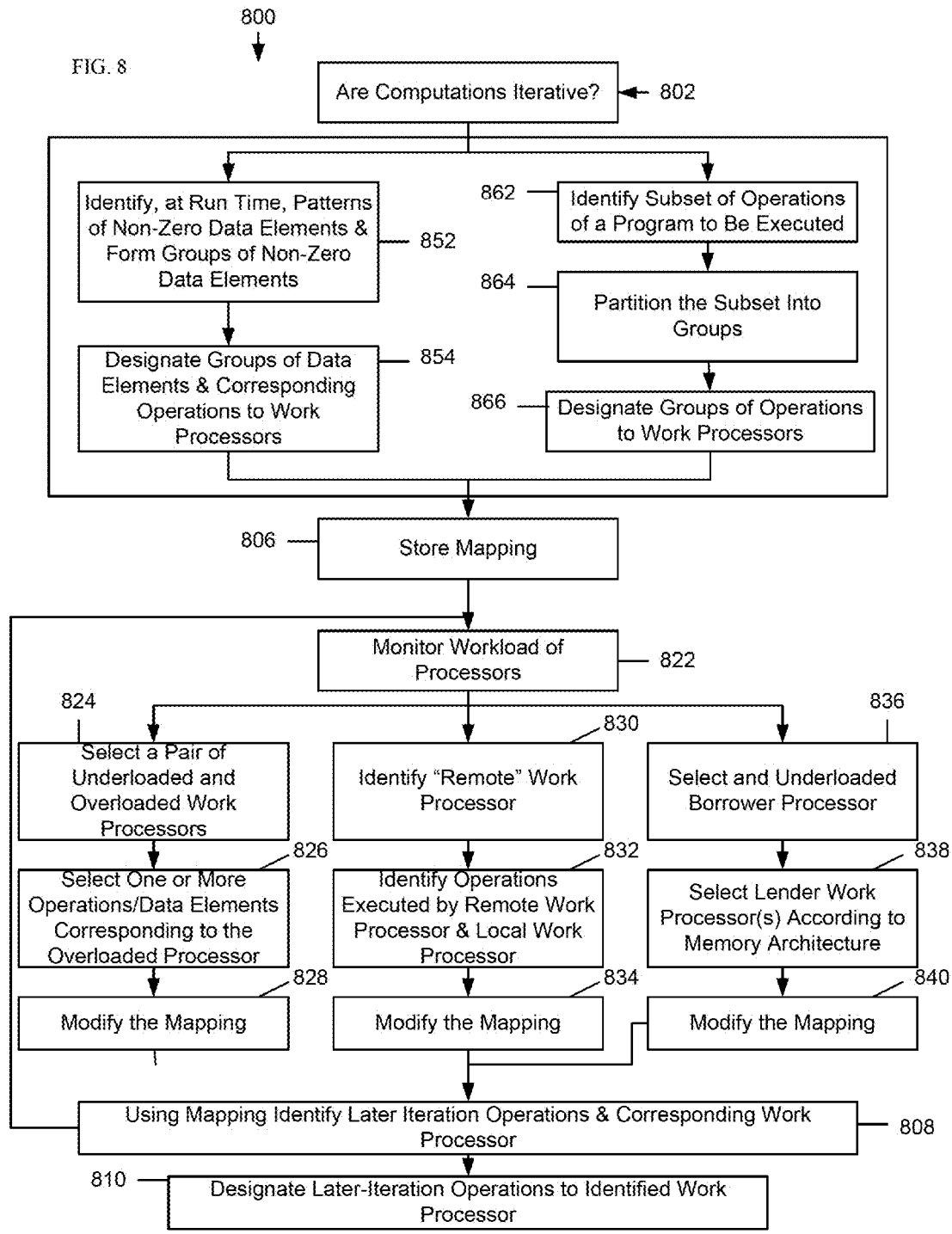
FIG. 8 illustrates a process of scheduling operations on work processors, according to one embodiment.

With reference to FIG. 8, in a process 800 a scheduler determines if more than one iterations are associated with a block of computations/operations, such as computations associated with a tensor (step 802). If several iterations are required, the scheduler dynamically schedules the operations that correspond to the first iteration (step 804).

Dynamic scheduling typically includes identifying, at run time, patterns of non-zero data elements, and forming groups of data elements that are non-zero (852). These groups are then designated to a number of cores/work processors (854). Designating a group of non-zero data elements to a work processor generally means that a number of operations associated with all of the non-zero data elements in the group are scheduled to be executed by that work processor. One or more of the groups may be designated to any particular work processor. Typically, each work processor/core is designated at least one group for execution of the operations corresponding to the data elements in that group. The different work processors may execute the respective designated operations in parallel.

In some embodiments, e.g., if the computations are associated with a tensor, the patterns of the non-zero data elements can change from one mode to another. The individual data elements themselves may not change; the grouping thereof can change, however, from one mode of the tensor to another. As such, the grouping step 852 and the designation step 854 can be mode specific, and may be repeated for each one of the selected modes. Consequently, the work processors would execute the operations in a mode-specific manner for each one of the selected modes.

In some embodiments, the iterative computations/operations are specified in a program, and the program structure requires one or more of the operations of a particular iteration to be executed only if a specified condition is TRUE. If the condition is data dependent, the scheduler can determine only at run time whether the condition is TRUE or FALSE. If the condition is determined to be FALSE, one or more operations of the first iteration are not to be executed and, hence, the scheduler need not designate those operations to any work processor. This generally introduces an irregularity in the set of operations to be executed.

In order to schedule the operations that are to be executed when irregularities exist, dynamic scheduling may include, in addition to the grouping of data elements in the step 852 or in the alternative, identifying a subset of operations of the first iteration that are to be executed (step 862). Such a subset can be computed by excluding from all of the operations of the first iterations the operations that require a condition to be TRUE but is determined to be FALSE at run time. The subset of operations is then partitioned into groups (step 864). The groups of the first-iteration operations that are to be executed are designated to the several work processors for parallel execution of those processors (step 866).

After dynamically scheduling the operations of the first iteration, the scheduler stores a mapping of different groups of data elements and/or operations to the different work processors (step 806). The mapping may include several mode-specific mappings, where each mode-specific mapping includes a mapping of different groups of data elements corresponding to a particular mode to the different work processors. As such, the step 806 may be repeated for each one or the selected modes.

While the operations in different iterations of the overall computation are generally different, if the irregularities in the computations are introduced because some data elements are zero, the irregularities in the operations often do not change significantly from one iteration to the next. Similarly, if the irregularities are introduced because some operations are to be executed only if a particular condition is TRUE and the condition was determined to be FALSE during the first iteration, the irregularities in such operations also may not change significantly from one iteration to the next.

Therefore, to distribute the second-iteration operations to the different work processor, the scheduler does not invoke dynamic scheduling again. Instead, the scheduler uses the map generated and stored in the step 806. For each group of data elements and/or operations of the first iteration, the scheduler identifies both the corresponding operations of a second iteration, and the work processor on which the first-iteration operations in the group were scheduled. (step 808). The scheduler then schedules the identified second-iteration operations to the identified work processor (step 810). During the second iteration, the steps 808, 810 may be repeated for each one of the selected modes, e.g., if the operations are associated with a tensor, using the respective mode-specific mappings. The steps 808, 810 may then be repeated for each iteration of the overall computations.

By avoiding dynamic scheduling in one or more subsequent iterations, the scheduling overhead, i.e., the computations to be performed by the scheduler to determine a schedule, can be minimized. By using a previously generated mapping and by taking advantage of the fact that the patterns of irregularities often do not change from one iteration to the next, parallelization of the operations can nevertheless be achieved while minimizing the scheduler overload.

In some embodiments, the mapping (or several mode-specific mappings) stored in the step 806 are modified prior to use thereof in the steps 808, 810, to balance the loading of the work processors, to improve locality of the data elements associated with the operations, and/or to minimize any adverse impact on the locality that may be caused by load balancing. For example, the load of one or more of the several work processors may be monitored (step 822). Monitoring the load of a work processor may include monitoring a load related to the processing performed by the work processor/core and/or monitoring data access by the work processor/core from a memory module, and/or a load related to the memory access. If the load of a work processor is less than a certain specified threshold, the work processor may be designated as underloaded. If the load of a work processor meets or exceeds a specified threshold, the processor may be designated as overloaded.

The scheduler may select a pair of work processors, such that one work processor is underloaded and the other one is overloaded (step 824). From the mapping, one or more first-iteration operations that were scheduled on the overloaded work processor and/or data elements corresponding to such operations are selected (step 826). The scheduler then modifies the mapping (or various mode-specific mappings) by changing the association between the selected first-iteration operations and/or data elements and the overloaded work processor to indicate a new designation of those operations and/or data elements to the underloaded work processor (step 828).

As such, in the subsequent steps 808, 810, the corresponding later-iteration operations are migrated from the overloaded work processor to the underloaded work processor. The corresponding later-iteration operations may be later-iteration operations that are associated with one or more data elements associated with the selected first-iteration operations and/or later-iteration operations associated with a condition associated with the selected first-iteration operations. By decreasing the loading of the overloaded work processor and by increasing utilization of the underloaded work processor, the overall load of all of the work processors can be balanced. The steps 824-828 can be repeated for various pairs of identified underloaded and overloaded processors and/or for different modes.

In some embodiments, the work processors are configured according to a NUMA hierarchy, as described above. Memory access patterns of one or more work processors are monitored in the step 822, and a work processor that accesses at least as many remote memory locations as a specified threshold is identified (step 830). That work processor may be called a "remote" work processor. One or more first-iteration operations designated to the identified remote work processor are selected such that one or more data elements associated with the selected operations are local to another processor, called a local processor (step 832). The scheduler then modifies the mapping (or various mode-specific mappings) by changing the association between the selected first-iteration operations and/or data elements and the remote work processor to indicate a new designation of those operations and/or data elements to the local work processor (step 834).

As such, in the subsequent steps 808, 810, the corresponding later-iteration operations are migrated from the remote work processor to the local work processor. The corresponding later-iteration operations are generally later-iteration operations that are associated with one or more data elements associated with the selected first-iteration operations. As these data elements are local to the local work processor, the migration can increase the overall locality of operations during the later iterations. The steps 830-834 can be repeated for various pairs of identified remote and local processors.

In some embodiments, both load balancing and locality improvement can be achieved, for example, by selecting a remote work processor that is also overloaded and a local processor that is underloaded. Often, a work processor can become overloaded at least in part because that processor is scheduled to execute operations that require remote access. By migrating operations from an overloaded, remote work processor to an underloaded, local work processor load balancing and locality improvement can be achieve simultaneously.

In other embodiments, work load and locality are simultaneously optimized such that one of the two parameters is improved while a degradation of the other is minimized. For example, the scheduler may select a borrower work processor that is determined to be underloaded (step 836). The mapping is to be modified to migrate operations from one or more lender work processors to the borrower work processor, so as to improve utilization thereof. In this, one or more data elements associated with one or more migrated operations are not local to the borrower work processor and, hence, the migration can cause a degradation of the locality. Therefore, scheduler selects the lender work processors such that the selected lender work processors are closest to the borrower work processor according to a NUMA topology (step 838). Thereafter, the mapping is modified to designate during the later iterations one or more operations that were designated to the selected lender work processor(s) during the first iteration (step 840). The migration of one or more operations according to the modified mapping can balance the load among several work processors while minimizing any reduction in memory locality.

In some embodiments, the monitoring step and/or the steps of modifying the mapping and related steps, i.e., one or more, or even all of the steps 822-840 are optional. For example, in some embodiments, after storing the mapping in the step 806, that mapping is used without modification in the step 808, followed by the step 810.

With reference to FIG. 9, while scheduling the operations associated with a tensor T (e.g., according to the process 800 described above), the data elements of the tensor T are partitioned into three groups for mode 1, namely, $G_1^1$, $G_2^1$, and $G_3^1$. It should be understood that three groups are illustrative only and that in general there can be only a single group and more than three, e.g., 5, 10, 30, 100, groups. The data elements are also partitioned for mode 2 of the tensor T into two groups, namely, $G_1^2$ and $G_2^2$. Although the tensor T has three dimensions/modes, partitioning is performed along two modes only. It should be understood, however, that in general partitioning may be performed for one or more modes of a tensor, and may be performed for all tensor modes. It should also be understood that a three-mode tensor is illustrative only that that the number of modes can be greater than three, such as 5, 9, 12, 20, etc.

During iteration 1, for mode 1, the first-iteration operations corresponding to the data elements of group $G_1^1$, designated as $O_1(G_1^1)$, are scheduled to be executed by a work processor P1, and the first-iteration operations corresponding to the data elements of group $G_2^1$, designated as $O_1(G_2^1)$, are scheduled to be executed by a work processor P2. For mode 2, the first-iteration operations corresponding to the data elements of group $G_1^2$, designated as $O_1(G_1^2)$, are scheduled to be executed by the work processor P1. In some embodiments, these operations may be scheduled to be executed by a different work processor, e.g., work processor P2 or work processor P3. The first-iteration operations corresponding to the data elements of group q, designated as $O_1(G_2^2)$, are scheduled to be executed by a work processor P4. In some embodiments, these operations may be scheduled on any of the work processors P1, P2, and P3.

A mapping $\mathcal{M}$ represents the designation of data elements in different groups and the corresponding operations to different work processors. In particular, the mapping $\mathcal{M}$ includes a mapping $\mathcal{M}^1$ corresponding to mode 1 and a mapping $\mathcal{M}^2$ corresponding to mode 2. The mapping $\mathcal{M}^1$ represents that for mode 1, the first iteration operations $O_1(G_1^1)$ and $O_1(G_2^1)$ are designated to work processors P1 and P2, respectively. The mapping $\mathcal{M}^2$ represents that for mode 2, the first iteration operations $O_1(G_1^2)$ and $O_1(G_2^2)$ are designated to work processors P1 and P4, respectively. The mapping $\mathcal{M}$ can be used by a scheduler S, (e.g., according to the process 800 described above), to designate later-iteration operations to different work processors. For example, using the mapping $\mathcal{M}^1$ for mode 1, the second iteration operations $O_2(G_1^1)$ and $O_2(G_2^1)$ can be designated to work processors P1 and P2, respectively. Using the mapping $\mathcal{M}^2$ for mode 2, the second iteration operations $O_2(G_1^2)$ and $O_2(G_2^1)$ may be designated to work processors P1 and P4, respectively. In some embodiments, prior to use in later iterations, the scheduler S may modify the mapping $\mathcal{M}$ (e.g., according to the process 800 described above), to balance work load of the work processors and/or to improve and/or optimize locality of the data elements associated with the operations.

Figure 10:
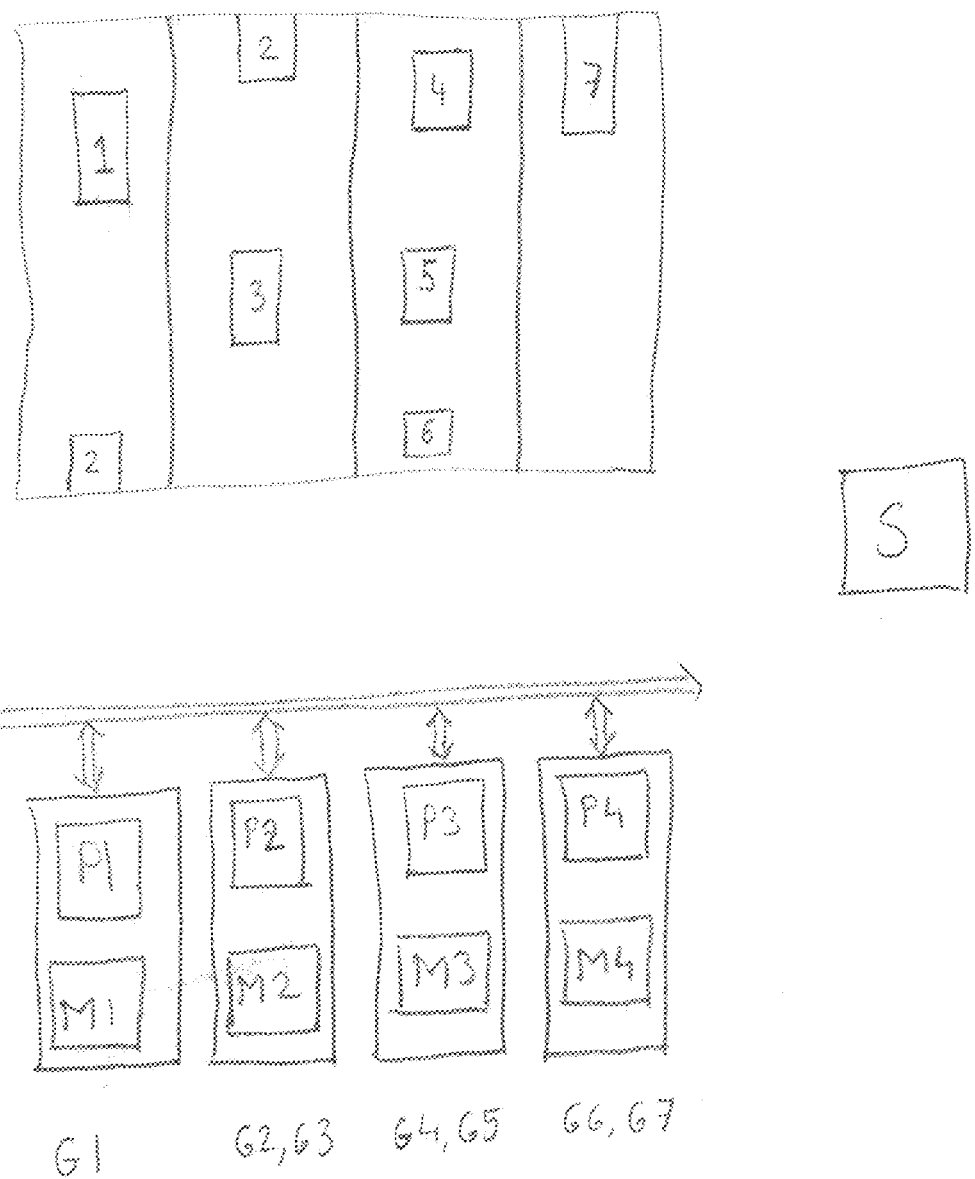
FIG. 10 illustrates modification of a mapping for optimization of processor workload and/or locality of data elements, according to one embodiment.

With reference to FIG. 10, from a set of operations, the first-iteration operations that are to be executed are partitioned into seven groups, namely G1-G7. The set of operations includes several operations that are not to be executed, e.g., because they are associated with a condition that must be TRUE, but that is determined to be FALSE at run time and/or with data elements that are zero. The operations that are not to be executed are not included in the groups G1-G7. It should be understood that the number of groups is illustrative only and that fewer or more groups are within the scope of various embodiments.

The first-iteration operations in the groups G1-G7 are to be executed by work processors (or cores) P1-P4 configured as a NUMA system. Specifically, work memory modules M1-M4 are local to work processors P1-P4, respectively, and any work memory module can be accessed by any work processor. The data elements corresponding to the operations of group G1 are stored in the work memory module M1. Some of the data elements corresponding to the operations of group G2 are stored in the work memory module M1 and the other data elements corresponding to the operations of group G2 and the data elements corresponding to the operations of group G3 are stored in the work memory module M2. The data elements corresponding to the operations of groups G4-G6 are stored in the work memory module M3, and the data elements corresponding to the operations of group G7 are stored in the work memory module M4. The number of work processors and work memory modules is illustrative only and, in general, there can be fewer (e.g., two) and more (e.g., 5, 10, 32, 50, 128, etc.) work processors. Similarly, there can be a single shared work memory module or more (e.g., 6, 8, 64, 100, 256, etc.) work memory modules. The number of work processors and work memory modules can be the same or can be different. In general, various NUMA architectures including a tree architecture are within the scope of various embodiments.

A mapping generated during the first iteration indicates that the first-iteration operations of group G1 are scheduled on the work processor P1, the first-iteration operations of groups G2 and G3 are scheduled on the work processor P2, the first-iteration operations of groups G4 and G5 are scheduled on the work processor P3, and the first-iteration operations of groups G6 and G7 are scheduled on the work processor P4. The scheduler S may monitor the work loads and/or memory access patterns of one or more of the work processors P1-P4, and may modify the mapping to balance the overall workload, to improve the locality of data elements, and/or to optimize simultaneously the overall work load and locality of data elements. For example, if the work processor P3 is underloaded and the work processor P4 is overloaded, migrating at least one operation from group G6 from the work processor P4 to the work processor P3 can improve both load balance and locality of data elements.

In another embodiment, if the work processors P1 and P2 are underloaded and the work processors P3 and P4 are overloaded, migrating one or more of the operations from one or more of groups G4-G6 from the work processor P3 to the work processor P2 can balance the overall workload. Additionally or in the alternative, migrating one or more of these operations from the work processor P3 to the work processor P1 may also balance the overall workload. Due to any of these migrations, however, the locality can decrease. According to the NUMA topology of the work processors P1-P4, the work processor P2 is closer than the work processor P1 to the work processor P3. Therefore, if the scheduler S selects the work processor P2 for migration and not the work processor P1, the reduction in the locality may be minimized and, thus, workload and locality can be optimized simultaneously.

The above-described techniques, implemented in various embodiments, are integrated in a commercial high-level optimizing source-to-source compiler RStream™. The RStream™ compiler provides an automatic source-to-source mapping from a high-level code expressed, e.g., in ANSI C to a target-specific source, for instance "OpenMP" code for a multi-core target system. RStream™ supports mapping for a wide range of targets that include SMP, Tilera, and GPUs. The strength of RStream™ is that it can take into account the hierarchical nature of processors and memories in modern High Performance Computing (HPC) systems along with their characteristics (such as size, optimal utilization pattern, etc.), and can perform a mapping that distributes the computation across the processors in a load-balanced manner and utilizes the various memories efficiently. The mapping process in RStream™ can perform the following tasks: dependence analysis, parallelism extraction, task-formation, locality improvement, processor assignment, data layout management, memory consumption management, explicit data movements generation (as well as their reuse optimization and pipelining with computations), and explicit synchronization generation. The compiler algorithms in RStream™ are well established for optimizing dense array codes and for optimizing sparse array codes, to an extent. RStream™, without any modification thereto, however, is not well suited for optimizing sparse tensor computations. Therefore, the techniques described herein and implemented in various embodiments can extend the support of RStream™ to sparse tensor codes.

Experimental Results: The effect of the various scheduling techniques described above and implemented in various embodiments on improving the parallel performance and scalability of sparse tensor computations on multi-core systems was evaluated. Real world sparse tensor data sets were used to evaluate the various embodiments. The real data sets used include: 1) the Facebook social network analysis data, 2) the Enron email dataset, and 3) an internal network traffic data logged continuously by a network traffic sensor and used during cybersecurity analysis.

Data Sets: The Facebook dataset contains information about various social networking activities (such as number of wall posts, messages, etc.) between 63891 Facebook users over 1591 days. Data collected for each of the 1591 days is a large sparse 63891×63891 array. The Enron email dataset contains information about emails exchanged between 105 users over a period of 27 months. The cybersecurity data used for our experiments is a very large five-dimensional sparse tensor with the modes being timestamp, senderIP, receiverIP, protocol, and responseBytes. The data is gathered from the network traffic sensor during a particular interval of time on one day. These data and their respective sizes are depicted in Table 1.

TABLE 1

| Dataset | Parameters | |
| --- | --- | --- |
| | Size | Non-zeros |
| Facebook | 63891 × 63891 × 1591 | 737934 |
| Enron | 105 × 105 × 27 | 5418 |
| Cyber | 14811811 × 1899 × 1899 × 3 × 6067 | 2085108 |

Figure 11:
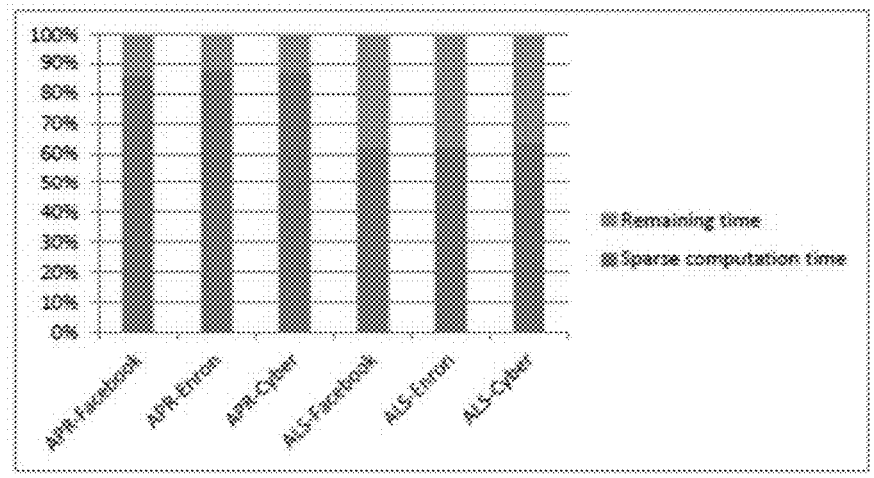
FIG. 11 depicts a percentage of sparse computations in CP-ALS and CP-APR decomposition methods.

Measurements: The baseline sequential versions that were evaluated include the sequential implementation of CP-ALS and CP-APR algorithms, i.e., Algorithms 1 and 2 depicted in FIGS. 1 and 2, respectively. The respective times taken to execute the CP-ALS and CP-APR algorithms on the above mentioned data sets were measured. Since various embodiments described herein focus on sparse tensor computations, only the timing of relevant portions of the algorithms involving computations related to the sparse input tensor are reported, to clearly demonstrate the effectiveness of the described techniques. However, to elucidate the importance of optimizing the sparse tensor computations, the percentage of times taken by sparse computations in the total execution time of the baseline sequential version of CP-ALS and CP-APR decomposition methods for the Facebook, Enron, and cyber data sets are shown in FIG. 11. As seen in FIG. 11, the sparse tensor computations generally account for a significant portion of the total execution time of these methods. Scalability is also measured in terms of parallel efficiency ($E_p$) given by:

$$E_p = \frac{T_1}{pT_p}$$

where $T_1$ is the time taken for the baseline sequential version and $T_p$ is the time taken for a parallel version and p is the number of work processors/cores.

Experimental System: Two modern multi-core systems were used to evaluate various embodiments. The first system was a dual socket 6-core system with Intel Xeon X5650 2.67 GHz processors (Intel Nehalem microarchitecture chips) that supports 12 concurrent threads. Each of the six cores in a socket has a 32 KB private L1 instruction cache, a 32 KB private L1 data cache, and a 256 KB private L2 cache. Each core also shares a 12 MB L3 cache. The system has 24 GB of DRAM. The second system was is a quad socket 8-core system with Intel Xeon E5-4620 2.2 GHz processors (Intel Sandy Bridge microarchitecture chips). This system supports 32 concurrent threads (64 threads if the Hyper-threading feature is used). Each of the 8 cores in a socket has a 32 KB private L1 instruction cache, a 32 KB private L1 data cache, and a 256 KB private L2 cache. Each core also shares a 16 MB L3 cache. The system has 128 GB of DRAM. Intel icc compiler, version 13.1.1 was used during the evaluations, and a parameter KMP_AFFINITY was set to the value "compact." The OpenMP library was used to parallelize the computations.

Parallel Versions for Evaluation: The following parallel versions of the CP-APR and CP-ALS algorithm were used for performance evaluation of various embodiments:

Par with sync: This is the parallel version in which the non-zeroes are partitioned statically and independent partial results are calculated by each processor in local variables and then the partial results are reduced after a barrier synchronization.

Par with no sync: This is the parallel version in which the non-zeroes are partitioned based on a static partition of the output elements. It needs no synchronization; it has significant load balancing concerns, however.

Par with no sync+dynamic: This is the parallel version in which the non-zeroes are partitioned dynamically based on the sparse pattern of the input data. This version needs no synchronization and also has good load balance. However it suffers from significant dynamic scheduling overhead.

Par with no sync+hybrid+no mem opt: This is the parallel version according to various embodiments described above, in which the non-zeroes are partitioned dynamically based on the sparse pattern of the input data in one iteration of a computation block and then the workload distribution information is stored to guide the work distribution for the rest of the iterations in the computation block. This version needs no synchronization, has good load balance, and also has relatively less dynamic scheduling overhead than Par with no sync+ dynamic.

Par with no sync+hybrid+mem opt: This is similar to Par with no sync+hybrid+no mem opt version, but additionally having the data locality optimization described above. This version is the representative version that includes all optimizations implemented in various embodiments.

Figure 12:
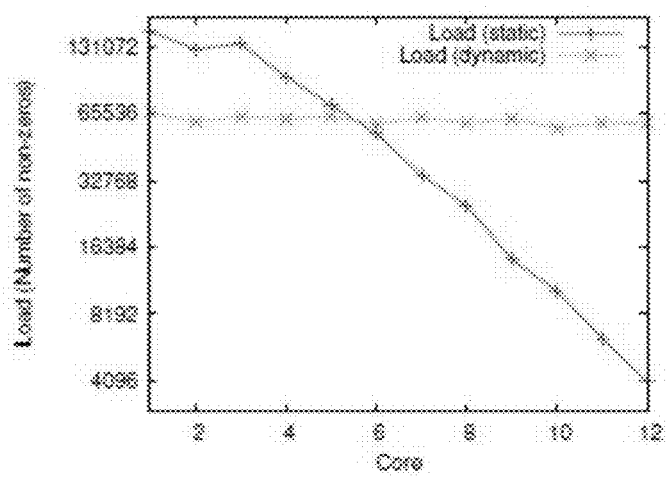
FIG. 12 depicts static and dynamic load distribution.

Load Balancing: The benefits of proper load balanced distribution of work in sparse tensor computations is illustrated using the $63891\times63891\times1591$ Facebook tensor with 737934 non-zeroes. The load on each processor in the parallelization of CP-APR method depends on the number of non-zeroes that each processor needs for its computation. So the number of non-zeroes processed by each processor can be a good measure of load on each processor. A low overhead static scheduling that distributes work load based on the statically known "number of output elements" generally leads to poor load balance, as observed for the Facebook tensor. This is evident from FIG. 12, which shows the number of non-zeroes distributed in each of the 12 cores in the dual socket 6-core system. Dynamic scheduling based on the pattern of the sparse data performs well in terms of load balance, as seen in FIG. 12.

Figure 13:
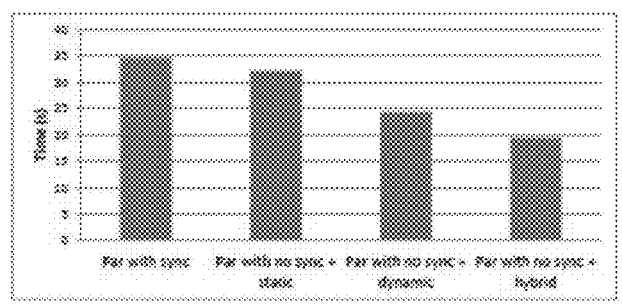
FIG. 13 depicts execution times achieved using different scheduling techniques, one of which is a hybrid dynamic-plus-static technique, according to one embodiment.

The balanced workload, however, comes with a scheduling overhead. FIG. 13 presents the execution time taken by different parallel versions of the CP-APR code with the Facebook tensor on 12 cores of the dual socket 6-core system. The parallelization with hybrid static and dynamic scheduling, according to an embodiment described above, pays the dynamic scheduling overhead only once and can result in a balanced load across processor cores that is similar to the balanced load obtained with dynamic-only scheduling (depicted in FIG. 12), with substantially less overhead. FIG. 13 shows that both aspects—a good load balance and a low scheduling overhead—are important to increasing parallel performance.

Figure 14:
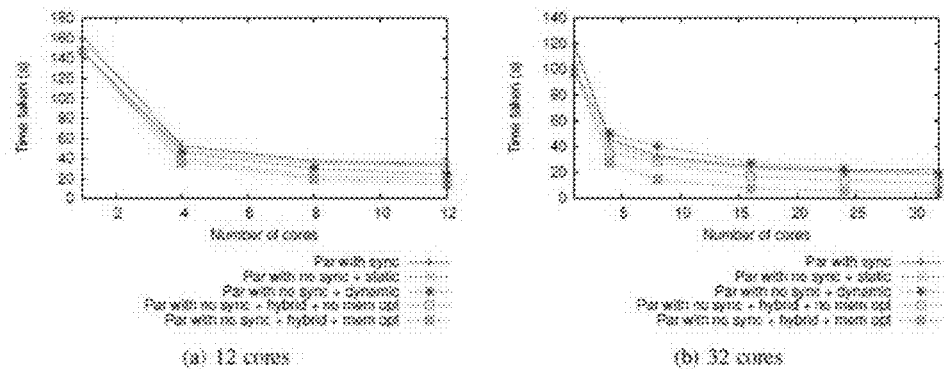
FIG. 14 shows a comparison of performances in terms of execution time of CP-APR on one data set achieved using different scheduling techniques, two of which are hybrid dynamic-plus-static techniques, according to different embodiments.

Parallel Performance and Scalability: The experimental results described below show improvements in the performance of the CP-APR algorithm using various embodiments described above. FIG. 14 shows the improvement in execution time due to various static-plus-dynamic scheduling techniques as applied to the CP-APR method operating on the Facebook tensor data on the two multi-core systems. The performance obtained using hybrid static and dynamic task scheduling that used the sparse input data pattern is substantially better than the performance obtained using other parallelization and scheduling techniques, e.g., static-only or dynamic-only task scheduling. Also, it is evident that the parallel versions (even the ones with reduced synchronizations) generally perform poorly when there is more memory traffic across sockets (i.e. when processor cores in different sockets are concurrently executing and generating memory traffic and polluting different levels of cache).

Figure 15:
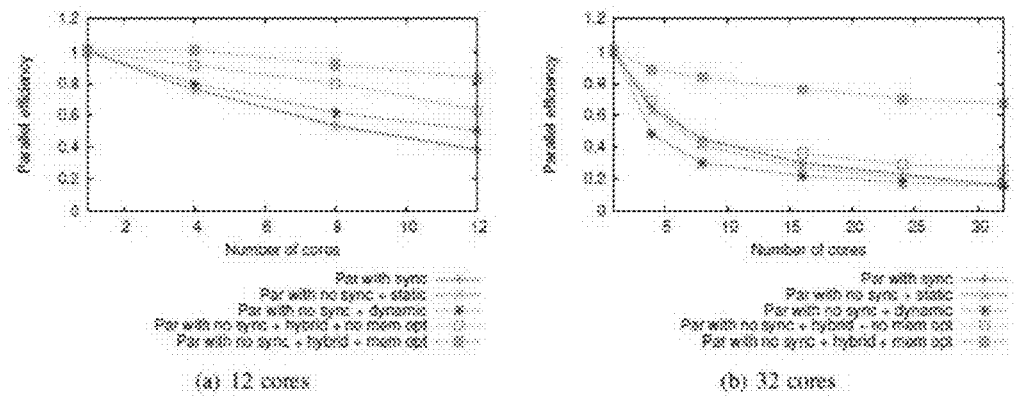
FIG. 15 shows a comparison of performances in terms of parallelization efficiency of CP-APR on one data set achieved using different scheduling techniques, two of which are hybrid dynamic-plus-static techniques, according to different embodiments.
Figure 16:
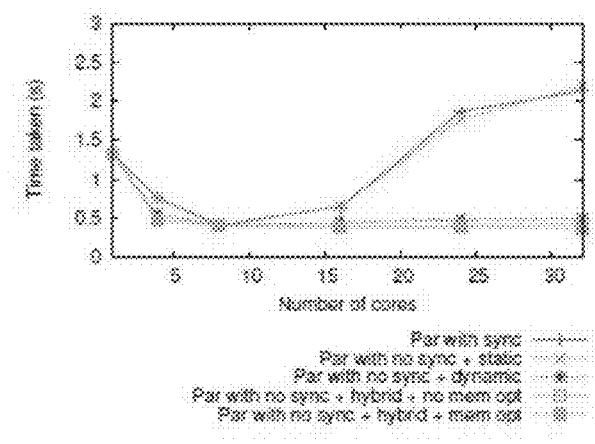
FIG. 16 shows a comparison of performances in terms of execution time of CP-APR on another data set achieved using different scheduling techniques, two of which are hybrid dynamic-plus-static techniques, according to different embodiments.

FIG. 15 shows the improved parallel efficiency and scalability achieved using various embodiments for up to 12 cores and up to 32 cores in the 12-core system and 32-core system, respectively. FIGS. 14 and 15 demonstrate that data locality optimizations can play a vital role in performance improvement as the number of work processors/cores increases. Therefore, even when all the cores are fully occupied and when there is a greater possibility of shared cache pollution, significant performance improvement can be obtained mainly due to the data locality optimizations respecting the NUMA model, that are implemented in some embodiments.

Figure 17:
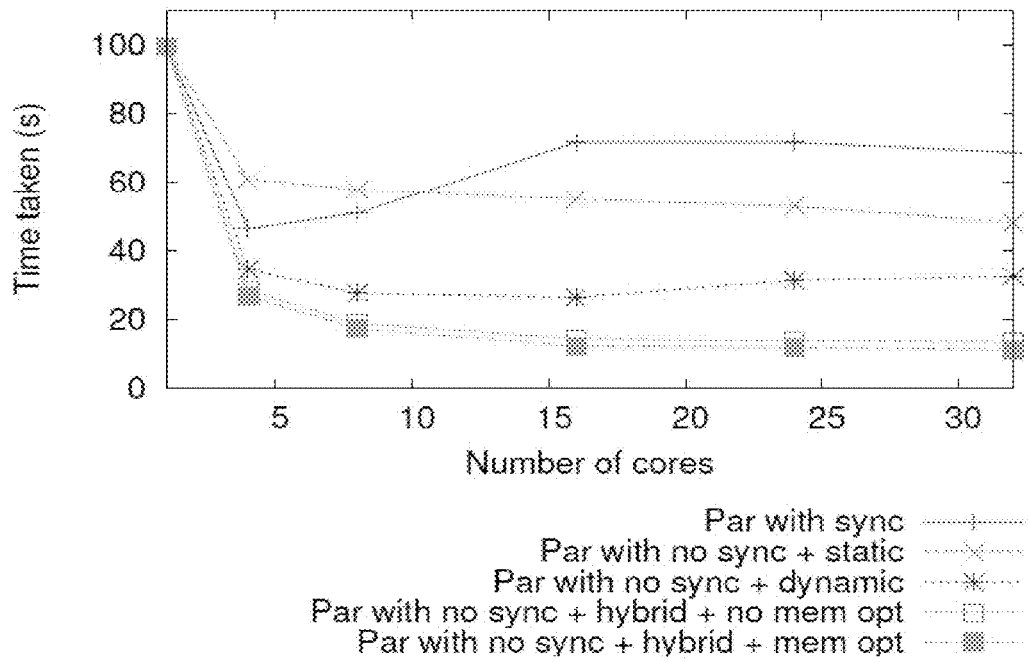
FIG. 17 shows a comparison of performances in terms of execution time of CP-APR on yet other data set achieved using different scheduling techniques, two of which are hybrid dynamic-plus-static techniques, according to different embodiments.

Similar measurements were obtained for the execution time of sparse computations in the CP-APR method operating on the relatively smaller Enron data set on the 32-core system. As shown in FIG. 17, the hybrid dynamic and static scheduling techniques show improved performance compared to other versions. Also, it can be seen that the performance degrades as the number of work processors/cores increases without data locality optimizations. The performance does not degrade, however, using the hybrid dynamic and static scheduling techniques implemented in various embodiments.

FIG. 17 shows the execution time of sparse tensor computations in the CP-APR method on the cyber data set on the 32-core system. As observed earlier, when more than one socket is in use, the memory traffic by processor cores across sockets tends to slow down the performance affecting the scalability. Without locality-aware load balanced scheduling, the performance generally drops with increasing number of work processors/processor cores, even though, as mentioned earlier, parallelism is exploited in sparse tensor computations with no synchronizations.

Figure 18:
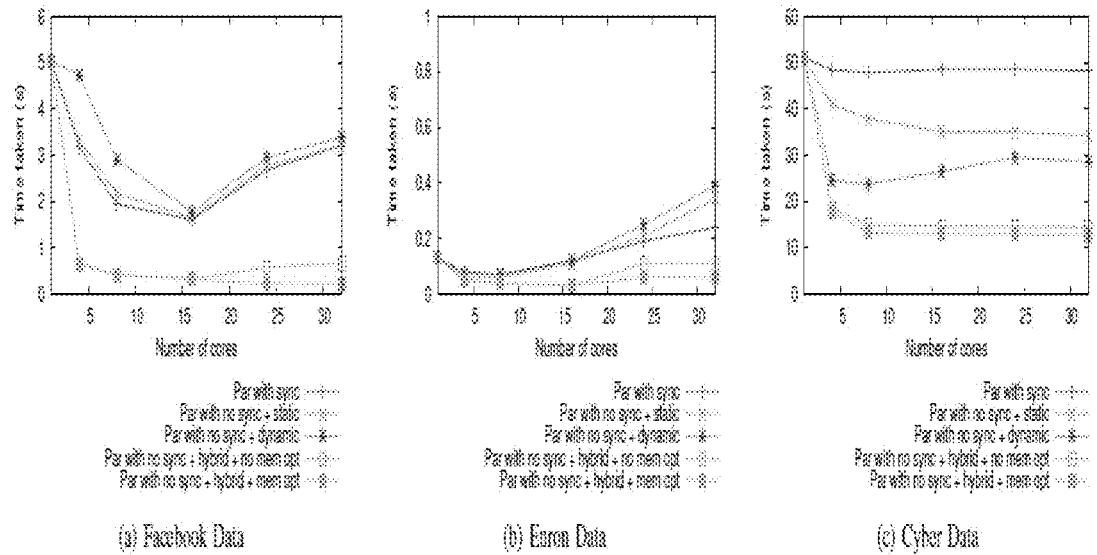
FIG. 18 shows a comparison of performances in terms of execution time of CP-ALS on three data sets achieved using different scheduling techniques, two of which are hybrid dynamic-plus-static techniques, according to different embodiments.

The improvements from the hybrid dynamic and static techniques, with and without locality-aware load balancing, are also evident from the experiments on CP-ALS algorithm using Facebook, Enron, and cyber data sets as shown in FIGS. 18($a$)-($c$). For CP-ALS on Facebook data, the performance of all other versions except for the hybrid dynamic and static scheduling with improved data locality, as implemented in some embodiments, deteriorates at core counts greater than 16. For CP-ALS on cyber data, the performance of all versions except for the hybrid dynamic and static scheduling techniques, as implemented in various embodiments, does not improve or even deteriorates as number of work processors/processor cores increases. For CP-ALS on Enron, the hybrid dynamic and static scheduling techniques, as implemented in various embodiments, show higher performance compared to other versions on the same number of cores.

Various embodiments described herein feature techniques to efficiently map large irregular computations with sparse multi-dimensional arrays (tensors) onto modern multi-core/multi-processor systems that may have non-uniform memory access (NUMA) architecture. A hybrid static-plus-dynamic task scheduling scheme with low overhead can effectively achieve parallelization of sparse computations. Locality-aware optimizations, that are based on, at least in part, the sparse input data pattern, can be applied to the hybrid static-plus-dynamic task scheduling mechanism. Various embodiments can achieve about four to five times improvement on the computation of two widely sparse tensor decomposition algorithms and some of these embodiments demonstrate scalable parallel performance on modern multi-core systems with up to 32 processor cores. In one embodiment, these techniques are integrated with a commercial high-level optimizing source-to-source compiler RStream™.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communications protocols to facilitate communications between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communications with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communications protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

Accordingly, we claim:

1. A method of scheduling operations on a plurality of work processors, the method comprising:

based on a grouping of a first subset of operations that are to be executed and that are selected from a first set of operations comprising at least one operation that is not to be executed, identifying by a scheduler, from a second set of operations comprising at least one operation that is not to be executed, a second subset of operations to be executed; and using a mapping between the first subset of operations and the work processors, the mapping representing at least one of: (i) parallelization of the first subset of operations, (ii) locality of data elements associated with the first subset of operations, and (iii) workload of the work processors, designating by the scheduler the second subset of operations to be executed to the work processors according to the mapping.

2. The method of claim 1, wherein:

the mapping comprises a first mode-specific mapping associated with a data structure comprising a plurality of data elements, at least one of which is zero, the first mode-specific mapping comprising: a first sub-mapping and a second sub-mapping;

the data elements are partitioned, based on, at least in part, which data elements of the data structure are non-zero, into a plurality of groups comprising a first group associated with the first mode and a second group also associated with the first mode, so that first-iteration operations corresponding to the first and second groups associated with the first mode are executable in parallel, respectively, by a first work processor and a second work processor from the plurality of work processors, the first set of operations comprising the first-iteration operations corresponding to the first and second groups associated with the first mode;

the first sub-mapping corresponding to the first mode represents a designation of the first-iteration operations corresponding to the first group associated with the first mode to the first work processor; and the second sub-mapping corresponding to the first mode represents a designation of the first-iteration operations corresponding to the second group associated with the first mode to the second work processor.

3. The method of claim 2, wherein:

the second subset of operations to be executed comprises: (i) second-iteration operations corresponding to the first group associated with the first mode, and (ii) second-iteration operations corresponding to the second group associated with the first mode; and designating by the scheduler the second subset of operations to be executed to the work processors according to the mapping comprises designating by the scheduler: (i) using the first sub-mapping corresponding to the first mode, second-iteration operations corresponding to the first group associated with the first mode to the first work processor, and (ii) using the second sub-mapping corresponding to the first mode, second-iteration operations corresponding to the second group associated with the first mode to the second work processor.

4. The method of claim 2, wherein the data structure comprises a tensor having at least three dimensions.

5. The method of claim 2, wherein a number of the first-iteration operations corresponding to the first group associated with the first mode is substantially equal to a number of the first-iteration operations corresponding to the second group associated with the first mode.

6. The method of claim 2, wherein:

the plurality of work processors is in electrical communication with a work memory, the work memory comprising a plurality of work memory modules, each work memory module comprising a different section of the data elements of the data structure; and each work processor in the plurality of work processors is coupled to at least one different work memory module.

7. The method of claim 6, further comprising, prior to designating the second subset of operations to be executed to the work processors, modifying the mapping according to a workload of at least one work processor.

8. The method of claim 7, further comprising:

monitoring for at least one of the work processors, a workload comprising a computation load corresponding to computation of operations designated to the at least one work processor, and a memory access load;

determining if the at least one work processor is underloaded based on, at least in part, at least one of the computation load and the memory access load; and modifying the mapping being based on, at least in part, a workload of at least one work processor determined to be underloaded.

9. The method of claim 7, wherein:
the first work processor is determined to be underloaded; and modifying the mapping comprises:

identifying a first neighbor work processor that is closest to the first work processor among the plurality of work processors, and wherein first-iteration operations corresponding to a first neighbor group of data elements associated with the first mode were designated to the first neighbor work processor; and migrating by the scheduler at least one second-iteration operation corresponding to the first neighbor group associated with the first mode, to the first mapping corresponding to a first mode, for execution by the first work processor.

10. The method of claim 9, wherein a data element associated with the at least one second-iteration operation is local to the first neighbor work processor, the migration simultaneously optimizing loading of the first and first neighbor work processors and locality of the data elements.

11. The method of claim 9, wherein identifying the first neighbor work processor comprises selecting a work processor that would have a workload at least up to a specified threshold after migrating one or more operations previously designated thereto to the first mapping corresponding to a first mode, for execution by the first work processor.

12. The method of claim 9, wherein identifying the first neighbor work processor comprises selecting a work processor determined to be overloaded.

13. The method of claim 9, further comprising:

identifying a second neighbor work processor that is closest to the first work processor among the plurality of work processors except for the first neighbor work processor, and wherein second-iteration operations corresponding to a second neighbor group of data elements associated with the first mode were designated to the second neighbor work processor; and migrating by the scheduler at least one second-iteration operation corresponding to the second neighbor group associated with the first mode, to the first mapping corresponding to a first mode, for execution by the first work processor.

14. The method of claim 7, wherein:
the first work processor is determined to be underloaded;
a work processor from the plurality of work processors that is different from the first work processor is designated as a lender work processor, wherein first-iteration operations corresponding to a lender group of data elements associated with the first mode were designated to the lender work processor; and modifying the mapping comprises migrating by the scheduler at least one second-iteration operation corresponding to the lender group associated with the first mode, to the first mapping corresponding to a first mode, for execution by the first work processor.

15. The method of claim 13, wherein the lender work processor is determined to be overloaded.

16. The method of claim 6, further comprising, prior to designating the second subset of operations to be executed to the work processors, modifying the mapping according to locality of data elements, modifying the mapping comprising:

identifying a lender work processor, wherein a first-iteration operation corresponding to a lender data element was designated to the lender work processor, the lender data element being local to the first work processor; and migrating by the scheduler a second-iteration operation corresponding to the lender data element to the first mapping corresponding to a first mode, for execution by the first work processor, the migration causing an increase in the locality of data elements.

17. The method of claim 16, wherein at least one of: (i) the first work processor is underloaded, and (ii) the lender work processor is overloaded.

18. The method of claim 2, wherein:
the mapping comprises a second mode-specific mapping comprising: (i) a first sub-mapping corresponding to a second mode associated with the data structure, and (ii) a second sub-mapping corresponding to the second mode;
the data elements are partitioned, based on, at least in part, which data elements of the data structure are non-zero, into a plurality of groups comprising a first group associated with the second mode and a second group associated with the second mode, so that first-iteration operations corresponding to the first and second groups associated with the second mode can be executed in parallel, respectively, by a third work processor and a fourth work processor from the plurality of work processors, the first set of operations comprising the first-iteration operations corresponding to the first and second groups associated with the second mode;
the first sub-mapping corresponding to the second mode comprising a designation of the first-iteration operations corresponding to the first group associated with the second mode to the third work processor; and
the second sub-mapping corresponding to the second mode comprising a designation of the first-iteration operations corresponding to the second group associated with the second mode to the fourth work processor.

19. The method of claim 18, wherein:
the second subset of operations to be executed comprises: (i) second-iteration operations corresponding to the first group associated with the second mode, and (ii) second-iteration operations corresponding to the second group associated with the second mode; and
designating by the scheduler the second subset of operations to be executed to the work processors according to the mapping comprises designating by the scheduler: (i) using the first sub-mapping corresponding to second mode, second-iteration operations corresponding to the first group associated with the second mode to the third work processor, and (ii) using the second sub-mapping corresponding to the second mode, second-iteration operations corresponding to the second group associated with the second mode to the fourth work processor.

20. The method of claim 1, further comprising determining and storing the mapping by the scheduler.

21. The method of claim 1, wherein:
an iterative program specifies the operations comprising the first set of operations and the second set of operations;
the first set of operations comprises at least one operation that is executable only if a data-dependent condition is TRUE, the condition being determined to be FALSE; and
the second set of operations comprises at least one operation that is also executable only if the condition is TRUE,
the method further comprising excluding from the second subset of operations to be executed the at least one operation from the second set of operations that is executable only if the condition is TRUE.

22. The method of claim 21, wherein:
the mapping comprises: (i) a first sub-mapping associated with the program, and (ii) a second sub-mapping also associated with the program;
the operations are partitioned, based on, at least in part, which operations are determined to be executed, into a plurality of groups comprising a first group and a second group, so that first-iteration operations of the first and second groups, respectively, are executable in parallel by a first work processor and a second work processor from the plurality of work processors, the first set of operations comprising the first-iteration operations of the first and second groups;
the first sub-mapping comprising a designation of the first-iteration operations of the first group to the first work processor; and
the second sub-mapping comprising a designation of the first-iteration operations of the second group to the second work processor.

23. The method of claim 22, wherein:
the second subset of operations to be executed comprises: (i) second-iteration operations corresponding to the first group, and (ii) second-iteration operations corresponding to the second group; and
designating by the scheduler the second subset of operations to be executed to the work processors according to the mapping comprises designating by the scheduler: (i) using the first sub-mapping, second-iteration operations corresponding to the first group to the first work processor, and (ii) using the second sub-mapping, second-iteration operations corresponding to the second group to the second work processor.

24. The method of claim 22, wherein:
the operations are associated with a plurality of data elements;
the plurality of work processors is in electrical communication with a work memory, the work memory comprising a plurality of work memory modules, each work memory module comprising a different section of the plurality of data elements; and
each work processor in the plurality of work processors is coupled to at least one different work memory module.

25. The method of claim 24, further comprising, prior to designating the second subset of operations to be executed to the work processors, modifying the mapping according to a workload of at least one work processor.

26. The method of claim 25, further comprising:
monitoring for at least one of the work processors, a workload comprising a computation load corresponding to computation of operations designated to the at least one work processor, and a memory access load;
determining if the at least one work processor is underloaded based on, at least in part, at least one of the computation load and the memory access load; and
modifying the mapping being based on, at least in part, a workload of at least one work processor determined to be underloaded.

27. The method of claim 25, wherein:
the first work processor is determined to be underloaded; and
modifying the mapping comprises:
identifying a first neighbor work processor that is closest to the first work processor among the plurality of work processors, and wherein first-iteration operations corresponding to a first neighbor group of data elements were designated to the first neighbor work processor; and migrating by the scheduler at least one second-iteration operation corresponding to the first neighbor group, to the first mapping, for execution by the first work processor.

28. The method of claim 25, wherein:
the first work processor is determined to be underloaded;
a work processor from the plurality of work processors that is different from the first work processor is designated as a lender work processor, wherein first-iteration operations corresponding to a lender group of data elements were designated to the lender work processor; and
modifying the mapping comprises migrating by the scheduler at least one second-iteration operation corresponding to the lender group to the first mapping, for execution by the first work processor.

29. The method of claim 28, wherein the lender work processor is determined to be overloaded.

30. A system comprising:
a first processor; and
a first memory coupled to the first processor, the first memory comprising instructions which, when executed by a processing unit comprising at least one of the first processor and a second processor, program the processing unit, for scheduling operations on a plurality of work processors, to:
identify, based on a grouping of a first subset of operations that are to be executed and that are selected from a first set of operations comprising at least one operation that is not to be executed, from a second set of operations comprising at least one operation that is not to be executed, a second subset of operations to be executed; and
designate, using a mapping between the first subset of operations and the work processors, the mapping representing at least one of: (i) parallelization of the first subset of operations, (ii) locality of data elements associated with the first subset of operations, and (iii) workload of the work processors,
the second subset of operations to be executed to the work processors according to the mapping.

31. The system of claim 30, wherein:
the mapping comprises a first mode-specific mapping associated with a data structure comprising a plurality of data elements, at least one of which is zero, the first mode-specific mapping comprising a first sub mapping and a second sub mapping;
the data elements are partitioned, based on, at least in part, which data elements of the data structure are non-zero, into a plurality of groups comprising a first group associated with the first mode and a second group also associated with the first mode, so that first-iteration operations corresponding to the first and second groups associated with the first mode are executable in parallel, respectively, by a first work processor and a second work processor from the plurality of work processors, the first set of operations comprising the first-iteration operations corresponding to the first and second groups associated with the first mode;
the first sub-mapping corresponding to the first mode represents a designation of the first-iteration operations corresponding to the first group associated with the first mode to the first work processor; and
the second sub-mapping corresponding to the first mode represents a designation of the first-iteration operations corresponding to the second group associated with the first mode to the second work processor.

32. The system of claim 31, wherein:
the second subset of operations to be executed comprises: (i) second-iteration operations corresponding to the first group associated with the first mode, and (ii) second-iteration operations corresponding to the second group associated with the first mode; and
to designate the second subset of operations to be executed to the work processors according to the mapping, the instructions program the processing unit to designate: (i) using the first sub-mapping corresponding to the first mode, second-iteration operations corresponding to the first group associated with the first mode to the first work processor, and (ii) using the second sub-mapping corresponding to the first mode, second-iteration operations corresponding to the second group associated with the first mode to the second work processor.

33. The system of claim 31, wherein the data structure comprises a tensor having at least three dimensions.

34. The system of claim 31, wherein a number of the first-iteration operations corresponding to the first group associated with the first mode is substantially equal to a number of the first-iteration operations corresponding to the second group associated with the first mode.

35. The system of claim 31, wherein:
the plurality of work processors is in electrical communication with a work memory, the work memory comprising a plurality of work memory modules, each work memory module comprising a different section of the data elements of the data structure; and
each work processor in the plurality of work processors is coupled to at least one different work memory module.

36. The system of claim 35, wherein the instruction further program the processing unit to modify the mapping according to a workload of at least one work processor, prior to designating the second subset of operations to be executed to the work processors.

37. The system of claim 36, wherein the instruction further program the processing unit to:
monitor for at least one of the work processors, a workload comprising a computation load corresponding to computation of operations designated to the at least one work processor, and a memory access load;
determine if the at least one work processor is underloaded based on, at least in part, at least one of the computation load and the memory access load; and
modify the mapping being based on, at least in part, a workload of at least one work processor determined to be underloaded.

38. The system of claim 36, wherein:
the first work processor is determined to be underloaded; and
to modify the mapping, the instructions program the processing unit to:
identify a first neighbor work processor that is closest to the first work processor among the plurality of work processors, and wherein first-iteration operations corresponding to a first neighbor group of data elements associated with the first mode were designated to the first neighbor work processor; and
migrate at least one second-iteration operation corresponding to the first neighbor group associated with the first mode, to the first mapping corresponding to a first mode, for execution by the first work processor.

39. The system of claim 38, wherein a data element associated with the at least one second-iteration operation is local to the first neighbor work processor, the migration simultaneously optimizing loading of the first and first neighbor work processors and locality of the data elements.

40. The system of claim 38, wherein to identify the first neighbor work processor the instructions program the processing unit to select a work processor that would have a workload at least up to a specified threshold after migrating one or more operations previously designated thereto to the first mapping corresponding to a first mode, for execution by the first work processor.

41. The system of claim 38, wherein to identify the first neighbor work processor the instructions program the processing unit to select a work processor determined to be overloaded.

42. The system of claim 38, wherein the instructions further program the processing unit to:
    identify a second neighbor work processor that is closest to the first work processor among the plurality of work processors except for the first neighbor work processor, and wherein second-iteration operations corresponding to a second neighbor group of data elements associated with the first mode were designated to the second neighbor work processor; and
    migrate at least one second-iteration operation corresponding to the second neighbor group associated with the first mode, to the first mapping corresponding to a first mode, for execution by the first work processor.

43. The system of claim 36, wherein:
    the first work processor is determined to be underloaded; and
    the instructions further program the processing unit to designate a work processor from the plurality of work processors that is different from the first work processor as a lender work processor, wherein first-iteration operations corresponding to a lender group of data elements associated with the first mode were designated to the lender work processor; and
    to modify the mapping, the instructions program the processing unit to migrate at least one second-iteration operation corresponding to the lender group associated with the first mode, to the first mapping corresponding to a first mode, for execution by the first work processor.

44. The system of claim 42, wherein the lender work processor is determined to be overloaded.

45. The system of claim 35, wherein the instructions further program the processing unit to modify the mapping according to locality of data elements, prior to designating the second subset of operations to be executed to the work processors, and to modify the mapping, the instructions program the processing unit to:
    identify a lender work processor, wherein a first-iteration operation corresponding to a lender data element was designated to the lender work processor, the lender data element being local to the first work processor; and
    migrate a second-iteration operation corresponding to the lender data element to the first mapping corresponding to a first mode, for execution by the first work processor, the migration causing an increase in the locality of data elements.

46. The system of claim 45, wherein at least one of: (i) the first work processor is underloaded, and (ii) the lender work processor is overloaded.

47. The system of claim 31, wherein:
    the mapping comprises a second mode-specific mapping comprising: (i) a first sub-mapping corresponding to a second mode associated with the data structure, and (ii) a second sub-mapping corresponding to the second mode;
    the data elements are partitioned, based on, at least in part, which data elements of the data structure are non-zero, into a plurality of groups comprising a first group associated with the second mode and a second group associated with the second mode, so that first-iteration operations corresponding to the first and second groups associated with the second mode can be executed in parallel, respectively, by a third work processor and a fourth work processor from the plurality of work processors, the first set of operations comprising the first-iteration operations corresponding to the first and second groups associated with the second mode;
    the first sub-mapping corresponding to the second mode comprising a designation of the first-iteration operations corresponding to the first group associated with the second mode to the third work processor; and
    the second sub-mapping corresponding to the second mode comprising a designation of the first-iteration operations corresponding to the second group associated with the second mode to the fourth work processor.

48. The system of claim 47, wherein:
    the second subset of operations to be executed comprises: (i) second-iteration operations corresponding to the first group associated with the second mode, and (ii) second-iteration operations corresponding to the second group associated with the second mode; and
    to designate the second subset of operations to be executed to the work processors according to the mapping, the instructions program the processing unit to designate: (i) using the first sub-mapping corresponding to second mode, second-iteration operations corresponding to the first group associated with the second mode to the third work processor, and (ii) using the second sub-mapping corresponding to the second mode, second-iteration operations corresponding to the second group associated with the second mode to the fourth work processor.

49. The system of claim 30, wherein the instructions further program the processing unit to determine and store the mapping by the scheduler.

50. The system of claim 30, wherein:
    an iterative program specifies the operations comprising the first set of operations and the second set of operations;
    the first set of operations comprises at least one operation that is executable only if a data-dependent condition is TRUE, the condition being determined to be FALSE at run time;
    the second set of operations comprises at least one operation that is also executable only if the condition is TRUE; and
    the instructions further program the processing unit to exclude from the second subset of operations to be executed the at least one operation from the second set of operations that is executable only if the condition is TRUE.

51. The system of claim 50, wherein:
    the mapping comprises: (i) a first sub-mapping associated with the program, and (ii) a second sub-mapping also associated with the program;
    the operations are partitioned, based on, at least in part, which operations are determined to be executed, into a plurality of groups comprising a first group and a second group, so that first-iteration operations of the first and second groups, respectively, are executable in parallel by a first work processor and a second work processor from the plurality of work processors, the first set of operations comprising the first-iteration operations of the first and second groups;

the first sub-mapping comprising a designation of the first-iteration operations of the first group to the first work processor; and the second sub-mapping comprising a designation of the first-iteration operations of the second group to the second work processor.

52. The system of claim 51, wherein:
the second subset of operations to be executed comprises: (i) second-iteration operations corresponding to the first group, and (ii) second-iteration operations corresponding to the second group; and
to designate the second subset of operations to be executed to the work processors according to the mapping, the instructions program the processing unit to designate: (i) using the first sub-mapping, second-iteration operations corresponding to the first group to the first work processor, and (ii) using the second sub-mapping, second-iteration operations corresponding to the second group to the second work processor.

53. The system of claim 51, wherein:
the operations are associated with a plurality of data elements;
the plurality of work processors is in electrical communication with a work memory, the work memory comprising a plurality of work memory modules, each work memory module comprising a different section of the plurality of data elements; and
each work processor in the plurality of work processors is coupled to at least one different work memory module.

54. The system of claim 53, wherein the instruction further program the processing unit to modify the mapping according to a workload of at least one work processor, prior to designating the second subset of operations to be executed to the work processors.

55. The system of claim 54, wherein the instruction further program the processing unit to:
monitor for at least one of the work processors, a workload comprising a computation load corresponding to computation of operations designated to the at least one work processor, and a memory access load;
determine if the at least one work processor is underloaded based on, at least in part, at least one of the computation load and the memory access load;
modify the mapping being based on, at least in part, a workload of at least one work processor determined to be underloaded.

56. The system of claim 54, wherein:
the first work processor is determined to be underloaded; and
to modify the mapping, the instructions program the processing unit to:
identify a first neighbor work processor that is closest to the first work processor among the plurality of work processors, and wherein first-iteration operations corresponding to a first neighbor group of data elements were designated to the first neighbor work processor; and
migrate at least one second-iteration operation corresponding to the first neighbor group, to the first mapping, for execution by the first work processor.

57. The system of claim 54, wherein:
the first work processor is determined to be underloaded;
the instructions further program the processing unit to designate a work processor from the plurality of work processors that is different from the first work processor as a lender work processor, wherein first-iteration operations corresponding to a lender group of data elements were designated to the lender work processor; and
to modify the mapping, the instructions program the processing unit to migrate at least one second-iteration operation corresponding to the lender group to the first mapping, for execution by the first work processor.

58. The system of claim 57, wherein the lender work processor is determined to be overloaded.

59. An article of manufacture comprising a non-transitory storage medium having stored therein instructions which, when executed by a processing unit, program the processing unit, for scheduling operations on a plurality of work processors, to:
identify, based on a grouping of a first subset of operations that are to be executed and that are selected from a first set of operations comprising at least one operation that is not to be executed, from a second set of operations comprising at least one operation that is not to be executed, a second subset of operations to be executed; and
designate, using a mapping between the first subset of operations and the work processors, the mapping representing at least one of: (i) parallelization of the first subset of operations, (ii) locality of data elements associated with the first subset of operations, and (iii) workload of the work processors
the second subset of operations to be executed to the work processors according to the mapping.

* * * * *